United States Patent
Sesia et al.

(10) Patent No.: US 10,110,265 B2
(45) Date of Patent: Oct. 23, 2018

(54) ENABLING INTERFERENCE MITIGATION AND CANCELLATION RECEIVERS

(71) Applicant: Telefonaktiebolaget LM Ericsson (publ), Stockholm (SE)

(72) Inventors: Stefania Sesia, Roquefort les Pins (FR); Robert Mark Harrison, Grapevine, TX (US); George Jöngren, Sundbyberg (SE); Bo Lincoln, Lund (SE); Lars Lindbom, Karlstad (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 15/309,683

(22) PCT Filed: May 7, 2015

(86) PCT No.: PCT/SE2015/050510
§ 371 (c)(1),
(2) Date: Nov. 8, 2016

(87) PCT Pub. No.: WO2015/171064
PCT Pub. Date: Nov. 12, 2015

(65) Prior Publication Data
US 2017/0244434 A1 Aug. 24, 2017

Related U.S. Application Data

(60) Provisional application No. 61/991,000, filed on May 9, 2014.

(51) Int. Cl.
*H04W 4/00* (2018.01)
*H04B 1/10* (2006.01)
(Continued)

(52) U.S. Cl.
CPC ......... *H04B 1/1027* (2013.01); *H04B 17/345* (2015.01); *H04J 11/005* (2013.01); *H04W 88/02* (2013.01)

(58) Field of Classification Search
CPC .... H04B 1/1027; H04B 17/345; H04W 88/02
See application file for complete search history.

(56) References Cited

U.S. PATENT DOCUMENTS

2015/0312893 A1* 10/2015 Prasad ................... H04B 7/024
370/328
2015/0312903 A1* 10/2015 Prasad ................... H04B 7/024
370/329
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, Jun. 2013, 1-209.
(Continued)

*Primary Examiner* — Clemence S Han
(74) *Attorney, Agent, or Firm* — Sage Patent Group

(57) ABSTRACT

A method (100) in a network node serving a User Equipment (UE) capable of network assisted interference cancellation is disclosed. The method involves a signaling (104) of an indication to the UE indicating whether the UE should enable or disable (108) the network assisted interference cancellation, or whether the UE should autonomously choose (110) to enable or disable the network assisted interference cancellation. The enabling or disabling is done for at least one of demodulating the downlink channel or computing the channel state information. The method further involves a receiving (106) of information from the UE about whether the network assisted interference cancellation has been used by the UE for at least one of demodulating the
(Continued)

100

104 - Signaling an indication to UE indicating UE to enable/disable 108 NAICS, or autonomously choose 110 to enable/disable NAICS 106 - Receiving information from UE informing whether NAICS has been used downlink channel and computing the channel state information. A related method in a UE is also disclosed, together with the network node and the UE as such.

30 Claims, 13 Drawing Sheets

(51) Int. Cl.
*H04J 11/00* (2006.01)
*H04B 17/345* (2015.01)
*H04W 88/02* (2009.01)

(56) References Cited

U.S. PATENT DOCUMENTS

2016/0295454 A1* 10/2016 Kim ................. H04B 7/024
2017/0048749 A1* 2/2017 Kim ................. H04B 17/345

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.3.0, Jun. 2013, 1-84.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.3.0, Jun. 2013, 1-176.

3GPP, "3rd Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.8.0, Mar. 2014, 1-495.

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.8.0, Mar. 2014, 1-144.

Unknown, Author, "Discussion on NAICS interference semi-static parameter blind detection and signalling", 3GPP TSG-RAN WG4 Meeting #70bis, R4-141522, Intel Corporation, San Jose Del Cabo, Mexico, Mar. 31-Apr. 4, 2014, 1-4.

Unknown, Author, "Way-Forward on Network Assisted Interference Cancellation", 3GPPTSG RAN WGI Meeting #76, RI-140806, Ericsson, Qualcomm Incorporated, Prague, Czech Republic, Feb. 10-14, 2014, 1-4.

Unknown, Author, "On CSI enhancements for NAICS", Ericsson, 3GPP TSG-RAN WG1#76bis, R1-141656, Shenzhen, China, Mar. 31-Apr. 4, 2014, 1-3.

* cited by examiner

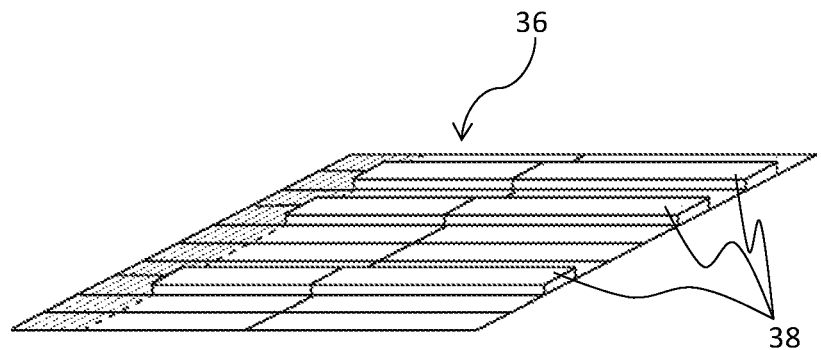
Fig. 5
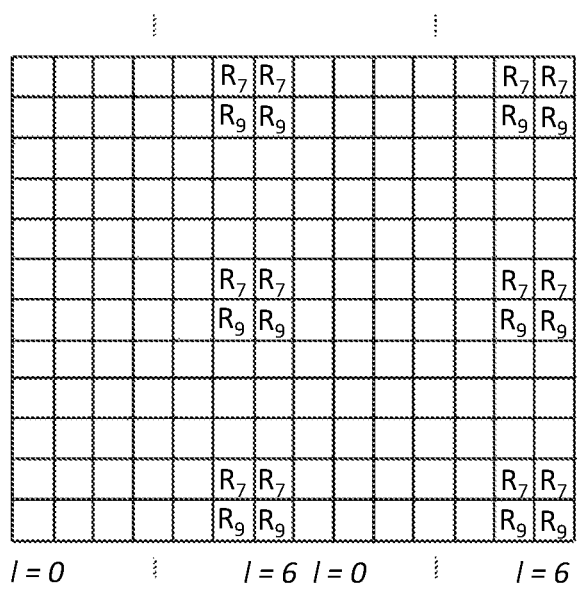
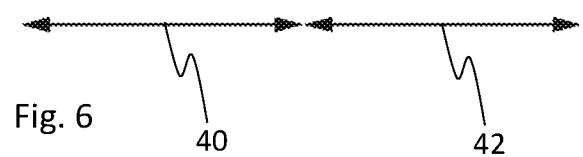
Fig. 6

100

```
┌─────────────────────────────────────────────────────────────────┐
│ 104 - Signaling an indication to UE for enabling/disabling 108 NAICS, │
│ or autonomously choosing 110 to enable/disable NAICS            │
└─────────────────────────────────────────────────────────────────┘
                                │
┌─────────────────────────────────────────────────────────────────┐
│ 106 - Receiving information from UE informing whether NAICS has │
│ been used                                                       │
└─────────────────────────────────────────────────────────────────┘
                                │
┌─────────────────────────────────────────────────────────────────┐
│ 112 - Receiving indication from UE indicating whether NAICS has │
│ used optional interference cancellation or mitigation techniques│
└─────────────────────────────────────────────────────────────────┘
```

```
┌─────────────────────────────────────────────────────────────────┐
│ 114 - Receiving information from UE indicating whether the UE   │
│ supports interference cancellation or mitigation techniques     │
└─────────────────────────────────────────────────────────────────┘
                                │
┌─────────────────────────────────────────────────────────────────┐
│ 102 - Determining whether network conditions are favorable for the │
│ UE to use NAICS                                                 │
└─────────────────────────────────────────────────────────────────┘
                                │
┌─────────────────────────────────────────────────────────────────┐
│ 104 - Signaling an indication to UE indicating UE to enable/disable │
│ 108 NAICS, or autonomously choose 110 to enable/disable NAICS   │
└─────────────────────────────────────────────────────────────────┘
                                │
┌─────────────────────────────────────────────────────────────────┐
│ 106 - Receiving information from UE informing whether NAICS has │
│ been used                                                       │
└─────────────────────────────────────────────────────────────────┘
```

202 - Receiving indication from the network node indicating UE to enable/disable 208 NAICS, or autonomously choose 210 to enable/disable NAICS 204 - Signaling information to network node informing whether NAICS has been used

202 - Receiving indication from the network node indicating UE to enable/disable 208 NAICS, or autonomously choose 210 to enable/disable NAICS 206 - Enabling or disabling NAICS in accordance with indication.

204 - Signaling information to network node informing whether NAICS has been used

202 - Receiving indication from the network node indicating UE to enable/disable 208 NAICS, or autonomously choose 210 to enable/disable NAICS 204 - Signaling information to network node informing whether NAICS has been used 212- Signaling indication to network node indicating whether the NAICS has used optional interference cancellation or mitigation techniques

214 - Signaling information to network node indicating whether UE supports optional interference cancellation or mitigation techniques 202 - Receiving indication from the network node indicating UE to enable/disable 208 NAICS, or autonomously choose 210 to enable/disable NAICS 204 - Signaling information to network node informing whether NAICS has been used

202 - Receiving indication from the network node indicating UE to enable/disable 208 NAICS, or autonomously choose 210 to enable/disable NAICS 204 - Signaling information to network node informing whether NAICS has been used 216 - Computing channel state information 218 - Reporting channel state information to the network node

220' - Receiving signaling configuring the UE for LTE transmission mode 1-9

222' - Receiving network assisted interference cancellation signaling

220' - Computing channel state information

222' - Reporting channel state information to the network node

Fig.22

ENABLING INTERFERENCE MITIGATION AND CANCELLATION RECEIVERS

TECHNICAL FIELD

This disclosure relates to Network-Assisted Interference Cancellation and Suppression (NAICS), to the demodulating of downlink channels, and to the computing the Channel State Information (CSI).

BACKGROUND

General background on the Long Term Evolution (LTE) is given in the following subsection. Additional information can be obtained from the 3rd Generation Partnership Project (3GPP) LTE specifications, including in particular the specifications 3GPP TS 36.211 V11.3.0 ("Physical Channel and Modulation"), 3GPP TS 36.212 V11.3.0 ("Multiplexing and Channel Coding"), 3GPP TS 36.213 V11.3.0 ("Physical Layer Procedures"), and 3GPP TS 36.300, V11.6.0 ("Overall Description").

Densification and Heterogeneous Deployments

In order to meet higher capacity demands and enhanced user experiences, cellular communications networks, such as LTE, need to be deployed with an increasing density of base stations. This densification can be achieved by cell splitting of macro cells and by deploying small cells in highly loaded geographical areas, or so called traffic hotspots, within the coverage area of macro cells. With densification of cellular networks, radio resources can be further reused and users will come closer to the serving base station which enables higher bitrates. Cellular networks with a mixture of macro cells and small cells with overlapping coverage areas are sometimes referred to as heterogeneous networks which are seen as an important complement to macro cell splitting. One example of such deployments is where clusters of pico cells are deployed within the macro coverage area to offload macro traffic. A pico base station represents here one example of a Low Power Node (LPN) transmitting with low output power and by then covers a much smaller geographical area than a high power node like a macro base station. Other examples of low power nodes are home base stations and relays.

A consequence of network densification is that User Equipment (UE) will experience lower geometries implying that downlink inter-cell interference can be more pronounced and limit the achievable bit rates. Hence, in dense cellular deployments interference mitigation techniques have the potential to substantially improve the user performance. Interference mitigation can either take place on the transmitter side or on the receiver side, or a combination of both. Interference mitigation techniques often explore the structure of the physical layer transmission of the radio access technology.

In heterogeneous networks, a mixture of cells of different sized and overlapping coverage areas is deployed. One example of such deployments is illustrated in FIG. 1, where pico cells 12 are deployed within the coverage area of a macro cell 10.

Other examples of low power nodes, also referred to as points, in heterogeneous networks are home base stations and relays. As will be discussed in the following, the large difference in output power (e.g. 46 dBm in macro cells and 30 dBm or less in pico cells) results in a different interference situation than what is seen in networks where all base stations have the same output power.

Throughout these specifications, nodes or points in a network are often referred to as being of a certain type, e.g., "macro" or "pico". Unless explicitly stated otherwise, this should not be interpreted as an absolute quantification of the role of the node/point in the network, but rather as a convenient way of discussion the roles of different nodes/points relative each other. Thus, a discussion about macro and pico cells could, for example, also be applicable to the interaction between micro and femto cells.

One aim of deploying low power nodes, such as pico base stations, within the macro coverage area is to improve system capacity by means of cell splitting gains as well to provide users with wide area experience of very high speed data access throughout the network. Heterogeneous deployments are particularly effective for covering traffic hotspots, i.e. small geographical areas with high user densities served by, for example, pico cells, and they represent an alternative deployment to denser macro networks.

The most basic means to operate heterogeneous deployments is to apply frequency separation between the different layers, i.e. macro cell 10 and pico cells 12 in FIG. 1 operate on different non-overlapping carrier frequencies and thereby avoid any interference between the layers. With no macro cell interference towards the under laid cells, here exemplified by the pico cells 12 in FIG. 1, cell splitting gains are achieved when all resources can simultaneously be used by the under laid cells. The drawback of operating layers on different carrier frequencies is that it may lead to resource-utilization inefficiency. For example, with low activities in the pico cells 12, it could be more efficient to use all carrier frequencies in the macro cell 10 and then basically switch off that of the pico. However, the split of carrier frequencies across layers is typically done in a static manner.

Another related means to operate heterogeneous networks is to share radio resources on same carrier frequencies by coordinating transmissions across macro and under laid cells. This type of coordination refers to as Inter-Cell Interference Coordination (ICIC) in which certain radio resources are allocated for the macro cells during some time period, whereas the remaining resources can be accessed by the under laid cells without interference from the macro cell. Depending on the traffic situations across the layers, this resource split can change over time to accommodate different traffic demands. In contrast to the above split of carrier frequencies, this way of sharing radio resources across layers can be made more or less dynamic depending on the implementation of the interface between the nodes. In LTE, an X2 interface has been specified in order to exchange different types of information between base station nodes. One example of such information exchange is that a base station can inform other base stations that it will reduce its transmit power on certain resources.

Time synchronization between base station nodes is required to ensure that ICIC across layers will work efficiently in heterogeneous networks. This is in particular of importance for time domain based ICIC schemes where resources are shared in time on the same carrier.

Physical Layer Design of LTE

The physical layer transmission in LTE uses Orthogonal Frequency Division Multiplexing (OFDM) in the downlink and Discrete Fourier Transform spread OFDM in the uplink. The basic LTE physical resource can thus be seen as a time-frequency grid as illustrated in FIG. 2, where each resource element 14 corresponds to one subcarrier during one OFDM symbol interval 16 including a cyclic prefix 18.

In the time domain, LTE downlink transmissions are organized into radio frames 20 of 10 ms, each radio frame 20 consisting of ten equally-sized subframes 22 of 1 ms, as illustrated in FIG. 3. A subframe 22 is divided into two slots, each of 0.5 ms time duration.

The resource allocation in LTE is described in terms of Resource Blocks (RB), where an RB corresponds to one slot in the time domain and 12 contiguous 15 kHz subcarriers in the frequency domain. Two consecutive-in-time RBs represent an RB pair and correspond to the time interval upon which scheduling operates.

Transmissions in LTE are dynamically scheduled in each subframe where the base station (also referred to as eNodeB) transmits downlink assignments/uplink grants to certain UEs via the Physical Downlink Control CHannel (PDCCH), or the enhanced PDCCH (ePDCCH) introduced in LTE Rel.11. In the LTE downlink, data is carried by the Physical Downlink Shared CHannel (PDSCH). In the uplink, the corresponding data channel is referred to as the Physical Uplink Shared CHannel (PUSCH). The PDCCHs are transmitted in the first OFDM symbol(s) in each subframe and span (more or less) the whole system bandwidth, whereas ePDCCH is mapped on RBs within the same resource region as used for PDSCH. Hence, ePDCCHs are multiplexed in the frequency domain with the PDSCH and it may be allocated anywhere over the entire subframe. A UE that has decoded an assignment carried by a PDCCH, or ePDCCH, knows which resource elements in the subframe contain data aimed for the UE. Similarly, upon receiving an uplink grant, the UE knows the time/frequency resources upon which it should transmit.

Demodulation of sent data requires estimation of the radio channel, which is done by using transmitted Reference Signals (RS), i.e., symbols that are known by the receiver. In LTE, Cell-specific Reference Signals (CRS) are transmitted in all downlink subframes and in addition to assist downlink channel estimation they are also used for mobility measurements performed by the UEs. LTE also supports UE specific RS, i.e. DeModulation Reference Signals (DMRS), which are provided to assist channel estimation for demodulation purposes only.

FIG. 4 illustrates how the mapping of PDCCH 26 and PDSCH 28 and CRS 30 can be done on resource elements within a downlink subframe 24. In this example, the PDCCHs 26 occupy the first out of three possible OFDM symbols, so in this particular case the mapping of data carried by PDSCH 28 can start at the second OFDM symbol. Since the CRS 30 is common to all UEs in the cell, the transmission of CRS 30 cannot be easily adapted to suit the needs of a particular UE. This is in contrast to DMRS, which means that each UE has reference signals of its own placed in the data region 32 of FIG. 4, as part of PDSCH. In LTE, subframes can be configured as Multimedia Broadcast Single Frequency Network (MBSFN) subframes, in which case CRSs are only present in the PDCCH 26 control region 34.

The length of the PDCCH control region, which can vary on a subframe-to-subframe basis, is conveyed in the Physical Control Format Indicator CHannel (PCFICH). The PCFICH is transmitted within this control region, at locations known to the UEs. After a UE has decoded the PCFICH, it knows the size of the control region and in which OFDM symbol the data transmission starts. Also transmitted in the control region is the Physical Hybrid-ARQ Indicator CHannel (PHICH). This channel carries ACKnowledgement/Negative ACKnowledgement (ACK/NACK) responses to a UE to inform the UE of whether the uplink data transmission in a previous subframe was successfully decoded by the base station or not.

FIG. 5 illustrates a downlink subframe showing 10 RB pairs 36 and configuration of three ePDCCH regions 38 of size 1 Physical Resource Block (PRB) pair each. The remaining RB pairs can be used for PDSCH transmissions.

In LTE Rel.11, it has been agreed to introduce UE-specific transmission for control information in the form of enhanced control channels, by allowing the transmission of generic control messages to a UE based on UE-specific reference signals. These enhanced control channels are placed in the data region, as shown in FIG. 5. In LTE Rel.11, for example, the enhanced PDCCH (ePDCCH) has been introduced. Enhanced PHICH (ePHICH) may be introduced in later releases. For the enhanced control channel in Rel.11, it has been agreed to use antenna port $p \in \{107,108,109,110\}$ for demodulation.

FIG. 6 illustrates an example of UE-specific reference symbols used for ePDCCH in LTE. R7 and R9 represent the DeModulation Reference Signal (DMRS) corresponding to antenna port 107 and 109 respectively. In addition, antenna port 108 and 100 can be obtained by applying an orthogonal cover as (1,−1) over adjacent pairs of R7 and R9 respectively. Even numbered slots 40 and odd numbered slots 42 are indicated by intervals in FIG. 6.

This enhancement means that precoding gains can be achieved for control channels, as well as for data channels. Another benefit is that different PRB pairs (or enhanced control regions) can be allocated to different cells or different transmission points within a cell, thus facilitating inter-cell or inter-point interference coordination between control channels. This is especially useful for the heterogeneous scenario, as will be discussed in the next section.

As previously indicated, CRS are not the only reference symbols available in LTE. As of LTE Release-10, a new RS concept was introduced with separate UE-specific RS for demodulation of PDSCH and RS for measuring the channel for the purpose of CSI feedback from the UE. The latter is referred to as CSI-RS. CSI-RS are not transmitted in every subframe, and they are generally sparser in time and frequency than RS used for demodulation. CSI-RS transmissions may occur every 5th, 10th, 20th, 40th, or 80th subframe according to a Radio Resource Control (RRC) configured periodicity parameter and an RRC-configured subframe offset.

A UE operating in connected mode can be requested by the base station to perform CSI reporting, e.g., reporting a suitable Rank Indicator (RI), one or more Precoding Matrix Indicators (PMIs) and a Channel Quality Indicator (COI). Other types of CSI are also conceivable, including explicit channel feedback and interference covariance feedback, but are not yet supported in the standard. The CSI feedback assists the base station in scheduling, including deciding the subframe and RBs for the transmission and which transmission scheme/precoder to use. The CSI feedback also provides information on a proper user bit rate for the transmission (link adaptation). In LTE, both periodic and aperiodic CSI reporting is supported. In the case of periodic CSI reporting, the terminal reports the CSI measurements on a configured periodical time basis on the physical uplink control signaling (PUCCH), whereas with aperiodic reporting the CSI feedback is transmitted on the physical uplink shared channel (PUSCH) at pre-specified time instants after receiving the CSI grant from the base station. With aperiodic CSI reports, the base station can thus request CSI reflecting downlink radio conditions in a particular subframe. A multitude of feedback modes are available. The eNodeB can configure the UE to report according to one feedback mode on PUSCH and another on PUCCH. The aperiodic modes on PUSCH are referred to as PUSCH 1-2, 2-0, 2-2, 3-0, 3-1, respectively and the periodic ones on PUCCH as 1-0, 1-1, 2-0, 2-1, respectively. These are explained in 3GPP TS 36.213 V11.3.0 ("Physical Layer Procedures").

A detailed illustration of which resource elements within a resource block pair that may potentially be occupied by the new UE-specific RS and CSI-RS is provided in FIG. 7. The CSI-RS utilize an orthogonal cover code of length two to overlay two antenna ports on two consecutive REs. As seen, many different CSI-RS patterns are available. For the case of 2 CSI-RS antenna ports 44, we see that there are 20 different patterns within a subframe. The corresponding number of patterns is 10 and 5 for 4 CSI-RS antenna ports 46 and 8 CSI-RS antenna ports 48, respectively. For Time Division Duplex, some additional CSI-RS patterns are available. In FIG. 7, potential positions are indicated for CRS port#1 and #2 50, CRS port #3 and #4 52, DMRS (Rel-8) port#5 (if configured) 54, UE specific RS or DMRS (Rel-9/10) 56, PDCCH 58, PDSCH 60, and CSI-RS (which are marked with a number corresponding to the CSI-RS antenna port).

In the following discussion, the term CSI-RS resource may be mentioned. In such a case, a resource corresponds to a particular pattern present in a particular subframe. Thus, two different patterns in the same subframe or the same CSI-RS pattern but in different subframes in both cases constitute two separate CSI-RS resources.

The CSI-RS patterns may also correspond to so-called zero-power CSI-RS, also referred to as muted REs. Zero-power CSI-RS correspond to a CSI-RS pattern whose REs are silent, i.e., there is no transmitted signal on those REs. Such silent patterns are configured with a resolution corresponding to the 4 antenna port CSI-RS patterns. Hence, the smallest unit to silence corresponds to four REs.

The purpose of zero-power CSI-RS is to raise the SINR for CSI-RS in a cell by configuring zero-power CSI-RS in interfering cells so that the REs otherwise causing the interference are silent. Thus, a CSI-RS pattern in a certain cell is matched with a corresponding zero-power CSI-RS pattern in interfering cells. Raising the SINR level for CSI-RS measurements is particularly important in applications such as coordinated multi-point (CoMP) or in heterogeneous deployments. In CoMP, the UE is likely to need to measure the channel from non-serving cells and interference from the much stronger serving cell would in that case be devastating. Zero-power CSI-RS is also needed in heterogeneous deployments where zero-power CSI-RS in the macro-layer is configured so that it coincides with CSI-RS transmissions in the pico-layer. This avoids strong interference from macro nodes when UEs measure the channel to a pico node.

The PDSCH is mapped around the Resource Elements (Res) occupied by CSI-RS and zero-power CSI-RS, so it is important that both the network and the UE are assuming the same CSI-RS/zero power CSI-RS configuration or else the UE is unable to decode the PDSCH in subframes containing CSI-RS or their zero-power counterparts.

Before an LTE terminal can communicate with an LTE network it first has to find and acquire synchronization to a cell within the network, i.e., performing cell search. Then it has to receive and decode system information needed to communicate with and operate properly within the cell, and finally access the cell by means of the so-called random-access procedure.

In order to support mobility, a terminal needs to continuously search for, synchronize to, and estimate the reception quality of both its serving cell and neighbor cells. The reception quality of the neighbor cells, in relation to the reception quality of the current cell, is then evaluated in order to conclude whether a handover (for terminals in connected mode) or cell re-selection (for terminals in idle mode) should be carried out. For terminals in connected mode, the handover decision is taken by the network based on measurement reports provided by the terminals. Examples of such reports are Reference Signal Received Power (RSRP) and Reference Signal Received Quality (RSRQ). Depending on how these measurements, possibly complemented by a configurable offset, are used, the UE can for example be connected to the cell with the strongest received power, or the cell with the best path gain, or something between the two. These selection strategies do not result in the same selected cell, as the base station output powers of cells of different type are different. This is sometimes referred to as link imbalance.

For example, the output power of a pico base station or a relay is in the order of 30 dBm or less, while a macro base station can have an output power of 46 dBm. Consequently, even in the proximity of the pico cell 62, the downlink signal strength from the macro cell 64 can be larger than that of the pico cell 62. From a downlink perspective, it is often better to select cell based on downlink received power, whereas from an uplink perspective, it would be better to select cell based on the path loss. The cell selection approaches are illustrated in FIG. 8 illustrating uplink and downlink coverage in a mixed cell scenario.

Hence, in the above scenario, it might be a better case, from a system perspective, to connect to the pico cell 62 even if the macro downlink is much stronger than the pico cell downlink. However, ICIC across layers would be needed when terminals operate within the region of the UL border 66 and the DL border 68 (the link imbalance zone) depicted in FIG. 8. Some form of interference coordination across the cell layers is especially important for the downlink control signaling. If this interference situation is not handled appropriately, a terminal in the region between the DL border 66 and UL border 68 in FIG. 8 and connected to the pico cell 62 cannot receive the downlink control signaling from the pico.

One approach of providing ICIC across layers is illustrated in FIG. 9, where an interfering macro cell 72 (downlink interference towards a pico cell 74) avoids scheduling unicast traffic in certain subframes 70, implying that neither PDCCHs nor PDSCH occur in those subframes 70. In such a way, it is possible to create low interference subframes, which can be used to protect pico users operating in the link imbalance zone. The macro base station (MeNB) indicates via the backhaul interface X2 to the pico base station (PeNB) which subframes it will avoid scheduling users within. The PeNB can then take this information into account when scheduling users operating within the link imbalance zone; such that these users are scheduled in subframes aligned with the low interference subframes at the macro layer, i.e. in interference protected subframes. However, pico cell users operating within the DL border can be scheduled in all subframes, i.e. in both protected and non-protected subframes.

In principle, data transmission (but not control signaling) in different layers could also be separated in the frequency domain by ensuring that scheduling decisions in the two cell layers are non-overlapping in the frequency domain, e.g. by exchanging coordination messages between the different base stations. For the control signaling this is not possible, as it must span the full bandwidth, according to the LTE specifications, and hence a time-domain approach must be used.

Coordinated Multipoint Transmission

Coordinated Multipoint Transmission (CoMP) transmission and reception refers to a system where the transmission and/or reception at multiple, geographically separated antenna sites is coordinated in order to improve system performance. More specifically, CoMP refers to coordination of antenna arrays that have different geographical coverage areas and/or coverage areas that are covered in different ways. In the subsequent discussion we refer to an antenna covering a certain geographical area in a certain manner as a point, or more specifically as a Transmission Point (TP). The coordination can either be distributed, by means of direct communication between the different sites, or by means of a central coordinating node.

CoMP is a tool introduced in LTE to improve the coverage of high data rates, the cell-edge throughput and/or to increase system throughput. In particular, the goal is to distribute the user perceived performance more evenly in the network by taking control of the interference in the system, either by reducing the interference and/or by better prediction of the interference.

CoMP operation targets many different deployments, including coordination between sites and sectors in cellular macro deployments, as well as different configurations of Heterogeneous deployments, where for instance a macro node coordinates the transmission with pico nodes within the macro coverage area.

There are many different CoMP transmission schemes that are considered; for example, Dynamic Point Blanking where multiple transmission points coordinates the transmission so that neighboring transmission points may mute the transmissions on the TFREs that are allocated to UEs that experience significant interference.

Dynamic Point Selection where the data transmission to a UE may switch dynamically (in time and frequency) between different transmission points, so that the transmission points are fully utilized.

Coordinated Beamforming where the TPs coordinate the transmissions in the spatial domain by beamforming the transmission power in such a way that the interference to UEs served by neighboring TPs are suppressed.

Joint Transmission (JT) where the signal to a UE is simultaneously transmitted from multiple TPs on the same time/frequency resource. The aim of joint transmission is to increase the received signal power and/or reduce the received interference (if the cooperating TPs otherwise would serve some other UEs without taking our JT UE into consideration).

The concept of a "point" is heavily used in conjunction with techniques for CoMP. In this context, a point corresponds to a set of antennas covering essentially the same geographical area in a similar manner. Thus a point might correspond to one of the sectors at a site, but it may also correspond to a site having one or more antennas all intending to cover a similar geographical area. Often, different points represent different sites. Antennas correspond to different points when they are sufficiently geographically separated and/or having antenna diagrams pointing in sufficiently different directions. Techniques for CoMP entail introducing dependencies in the scheduling or transmission/reception among different points, in contrast to conventional cellular systems where a point from a scheduling point of view is operated more or less independently from the other points. Downlink (DL) CoMP operations may include, e.g., serving a certain UE from multiple points, either at different time instances or for a given subframe, on overlapping or not overlapping parts of the spectrum. Dynamic switching between transmission points serving a certain UE is often termed as Dynamic Point Selection (DPS). Simultaneously serving a UE from multiple points on overlapping resources is often termed as JT. The point selection may be based, e.g., on instantaneous conditions of the channels, interference or traffic. CoMP operations are intended to be performed, e.g., for data (PDSCH) channels and/or control channels such as ePDCCH.

CoMP Feedback

A common denominator for the CoMP transmission schemes is that the network needs CSI information not only for the serving TP, but also for the channels linking the neighboring TPs to a terminal. By, for example, configuring a unique CSI-RS resource per TP, a UE can resolve the effective channels for each TP by measurements on the corresponding CSI-RS. A CSI-RS resource can loosely be described as the pattern of resource elements on which a particular CSI-RS configuration is transmitted. A CSI-RS resource is determined by a combination of "resourceConfig", "subframeConfig", and "antennaPortsCount", which are configured by RRC signaling. It should be noted that the UE is likely unaware of the physical presence of a particular TP, it is only configured to measure on a particular CSI-RS resource, without knowing of any association between the CSI-RS resource and a TP.

CoMP feedback for LTE Rel 11 builds upon per CSI-RS resource feedback which corresponds to separate reporting of CSI for each of a set of CSI-RS resources. Such a CSI report could for example correspond to a PMI, RI, and/or CQI, which represent a recommended configuration for a hypothetical downlink transmission over the same antennas used for the associated CSI-RS (or as the RS used for the channel measurement). More generally, the recommended transmission should be mapped to physical antennas in the same way as the reference symbols used for the CSI channel measurement. Potentially, there could be interdependencies between the CSI reports; for example, they could be constrained to have the same RI, so-called rank inheritance.

Typically there is a one-to-one mapping between a CSI-RS and a TP, in which case per CSI-RS resource feedback corresponds to per-TP feedback; that is, a separate PMI/RI/CQI is reported for each TP.

The considered CSI-RS resources are configured by the eNodeB as the CoMP Measurement Set.

Interference Measurements for CoMP

For efficient CoMP operation it is equally important to capture appropriate interference assumptions when determining the CQIs as it is to capture the appropriate received desired signal.

In uncoordinated systems the UE can effectively measure the interference observed from all other TPs (or all other cells), which will be the relevant interference level in an upcoming data transmission. Such interference measurements are typically in releases prior to Rel-11 performed by analyzing the residual interference on CRS resources (after the UE subtracts the impact of the CRS signal).

In coordinated systems performing CoMP such interference measurements becomes increasingly irrelevant. Most notably, within a coordination cluster an eNodeB can to a large extent control which TPs that interferes a UE in any particular TFRE. Hence, there will be multiple interference hypotheses depending on which TPs are transmitting data to other terminals.

Interference Measurement Resource

For the purpose of improved interference measurements, new functionality is introduced in LTE Release 11, where the agreement is that the network will be able to configure a UE to measure interference on a particular Interference Measurement Resource (IMR) that identifies a particular set of REs in the time and frequency grid that is to be used for a corresponding interference measurement. An alternative name of IMR used in LTE specifications is CSI-Interference Measurement (CSI-IM). The network can thus control the interference seen on an IMR, by for example muting all TPs within a coordination cluster on the IMR, in which case the UE will effectively measure the inter CoMP cluster interference. Moreover, it is essential that an eNodeB can accurately evaluate the performance of a UE given different CoMP transmission hypotheses—otherwise the dynamic coordination becomes meaningless. Thus the system need to be able to track/estimate also different intra-cluster interference levels corresponding to different transmission and blanking hypotheses.

Quasi-Co-Location of Antenna Ports

One fundamental property of DL CoMP is the possibility to transmit different signals and/or channels from different geographical locations (points). One of the principles guiding the design of the LTE system is transparency of the network to the UE. In other words, the UE is able to demodulate and decode its intended channels without specific knowledge of scheduling assignments for other UEs or network deployments.

Channel estimation based on RS often makes use of assumptions regarding similarity of the channels over which different RS (where each RS typically corresponds to a logical entity called antenna port) is transmitted. Such assumptions of similar channel properties between different antenna ports are referred to as antenna port quasi-co-location assumptions. The overall co-location assumptions a UE makes for a certain channel type (e.g. for PDSCH, or for ePDCCH) are collected into a co-location UE behavior, or "behavior" for short. The "quasi" part of quasi-co-location refers to the fact that co-location does not necessarily imply physical colocation of the antenna ports associated to the channels, but rather colocation with respect to the listed channel and signal properties.

It is observed here that, even though in general the channel from each antenna port to each UE receive port is substantially unique, some statistical properties and propagation parameters may be common or similar among different antenna port, depending on whether the different antenna ports originate from the same point or not. Such properties include, e.g., the received power level for each port, the delay spread, the Doppler spread, the received timing (i.e., the timing of the first significant channel tap) and the frequency shift.

Typically, channel estimation algorithms perform a three step operation. A first step consists of the estimation of some of the statistical properties of the channel. A second step consists of generating an estimation filter based on such parameters. A third step consists of applying the estimation filter to the received signal in order to obtain channel estimates. The filter may be equivalently applied in the time or frequency domain. Some channel estimator implementations may not be explicitly based on the three steps method described above, but still exploit the same principles.

Obviously, accurate estimation of the filter parameters in the first step leads to improved channel estimation. Even though it is often in principle possible for the UE to obtain such filter parameters from observation of the channel over a single subframe and for one RS port, it is usually possible for the UE to improve the filter parameters estimation accuracy by combining measurements associated with different antenna ports (i.e., different RS transmissions) sharing similar statistical properties. Furthermore, the channel estimation accuracy may be improved by combining RSs associated to multiple PRBs.

It is observed here that the network is typically aware of which RS ports are associated with channels with similar properties, based on its knowledge of how antenna ports are mapped to physical points, while the UE is conventionally not aware a priori of such information, because of the transparency principle of network transmission. This creates a need to introduce antenna port quasi-co-location assumptions in the LTE specifications to firmly establish which antenna ports the UE may assume to have similar properties and what those properties are. For example, the new transmission mode 10 introduced in Rel-11 supports dynamic signaling of quasi-co-location information using a DCI format transmitted on a DL control channel (like PDCCH or ePDCCH). For example, Downlink Control Information (DCI) format 2D used in transmission mode 10 may be used for signaling that DMRS for PDSCH is co-located with a specific CSI-RS resource and a specific CRS. Basically, a message state in the DCI format gives an index into a configurable table of CSI-RS resources used for defining the meaning of the message state.

The same message state is also used to signal information on how to map the PDSCH onto the resource element grid, including what OFDM symbol to start the PDSCH on, which REs corresponding to a CRS to map around, what MBSFN configuration to assume, and what Zero Power (ZP) CSI-RS configuration to assume. The RRC-configurable table defining the meaning of each associated message is popularly referred to as the PQI table, where PQI stands for PDSCH mapping and Quasi-co-location Information. Correspondingly, the message state itself may be referred to as a PQI indicator.

Interference Mitigation Aspects

Interference mitigation on the transmitter side refers to methods that aim to coordinate the physical channel transmissions across cells to avoid severe interference. A simple example is when an aggressor base station occasionally mutes its transmissions on certain radio resources in order for a victim cell to schedule interference sensitive UEs on radio resources with reduced interference. LTE features to coordinate transmissions have been specified in the context of ICIC and CoMP. In the case of ICIC, an eNodeB (eNB) sends a message over the LTE inter-eNB interface X2 with coordination information that a receiving eNB can take into account when scheduling interference sensitive users. In the case of CoMP, a cluster of transmission points, or base stations, can jointly and synchronously transmit the same signals to a UE and by then increase the received power on the desired signals or it can as in the ICIC case coordinate the transmissions to avoid inter-point interference.

The following ICIC messages over X2 have been specified in 3GPP TS 36.423 V11.8.0 "X2 Application Protocol (X2AP)":

UL Overload Interference Indication (OII) indicates per RB the interference level (low, medium, high) experienced by the indicated cell on all RBs.

UL High Interference Indication (HII) indicates per RB the occurrence of high interference sensitivity, as seen from the sending eNB.

Received Narrow Transmit Power (RNTP) indicates per RB whether DL transmission power is lower than the value indicated by a threshold.

Almost Blank Subframe (ABS) pattern indicating the subframes the sending eNB will reduce power on some physical channels and/or reduced activity.

The X2 messages OII, HII and RNTP were specified in LTE Rel.8 and represent methods for coordinating physical data channel transmissions in the frequency domain across cells. The ABS message, however, was specified in LTE Rel.10 as a time domain mechanism to primarily protect reception of PDCCH, PHICH and PDSCH in the small cells by letting macro cells occasionally mute, or reduce transmits power on PDCCH/PDSCH in certain subframes. The eNB ensures backwards compatibility towards UEs by still transmitting necessary channels and signals in the ABS for acquiring system information and time synchronization.

On the receiver side of techniques to mitigate inter-cell interference, Interference Rejection Combining (IRC) is a well-known receiver type for suppressing interference and requires estimation of an interference/noise covariance matrix. Other receiver types for interference mitigation are those based on Interference Cancellation (IC), in which unwanted received signals (intra/inter-cell interference) are estimated and subtracted from the received signals. Both IRC and IC are, since 3GPP Rel.11, established as UE reference receiver techniques in LTE. However, IC in LTE Rel.11 was restricted to cancellation of always-on signals, such as the CRS, in which the network assists the UE on how these signals are transmitted in the aggressor cells. There is currently an ongoing LTE Rel.12 study on network-assisted interference cancellation and suppression of interference corresponding to scheduling of data.

Inter-cell interference is often one of the dominant impairments limiting receiver performance and the achievable data rates in cellular networks. In traditional, linear receivers, multiple antennas, spatial selectivity and IRC weight design has been used to mitigate such interference.

More advanced receivers employing enhanced interference suppression schemes, maximum likelihood techniques and IC techniques are gaining popularity for mitigating DL interference arising from neighbor-cell transmissions to UEs in those cells. Such receivers may be used to explicitly remove all or parts of the interfering signal. As an example, an IC receiver in the victim UE may be used to demodulate and optionally decode the interfering signals, producing an estimate of the transmitted and the corresponding received signal, and removing that estimate from the total received signal to improve the effective Signal to Interference plus Noise Ratio (SINR) for the desired signal. In post-decoding IC receivers, the interfering data signal is demodulated, decoded, its estimated contribution to the received signal is regenerated, and subtracted. In pre-decoding receivers, the regeneration step is performed directly after demodulation, bypassing the channel decoder. The preferred mode to perform such cancellation is by applying soft signal mapping and regeneration, as opposed to hard symbol or bit decisions. ML receivers can as well be used to jointly detect the useful and interference signals in accordance to the ML criterion. Additionally iterative ML receivers can be defined which exploits the decoding of the interfering signal(s).

To apply these advanced receivers to signals originating from other cells, knowledge of certain signal format parameters may be required to configure the receiver. For pre-decoding IC, the resource allocation, modulation format, any precoding applied, the number of layers, etc., may be useful, and may be obtained via blind estimation, eavesdropping other-cell control signaling, or via network (NW) assistance features. For post-decoding, additional transport format parameters are required, which may typically only be obtained from receiving or eavesdropping the related control signaling.

The two approaches differ by the achievable cancellation efficiency, i.e., the fraction of the impairment power left after the cancellation operation—they may be essentially equal in some scenarios and vary significantly in others, the post-decoding IC approach typically providing superior performance at "high" SINR operating points", i.e. when there is high probability to decode the interfering signal. They typically also differ by the computational resources required (the post-decoding solution implies Turbo decoding processing) and by the processing delay incurred (the post-decoding solution requires buffering the entire code block of the interfering signal).

Network-Assisted Interference Cancellation and Suppression

In 3GPP, interference cancellation has been widely discussed. In Rel-11, CRS-IC, Primary Synchronization Sequence (PSS)/Secondary Synchronization Sequence (SSS), and Physical Broadcast CHannel (PBCH) IC has been standardized for heterogeneous network deployments. To enhance UE performance, PDSCH and PDCCH/ePDCCH cancellation are under discussion in Rel-12. In Rel-11, in order to enable CRS-IC, PSS/SSS, and PBCH IC, the eNB needs to provide certain assistance information, including CRS ports, cell ID, and MBSFN configuration. The UE utilizes this information to cancel CRS, PSS/SSS, and PBCH. In Rel-12, how to enhance UE performance by interference cancellation at data channels is still under discussion.

As for terminology in this disclosure, we use

Serving Cell (SC), which is the cell to which the UE is currently attached

Neighboring Cell(s) (NC), which is the cell(s) where the transmission of data is typically interfering with the reception of data from the SC Interference Cancellation (previously denoted IC), which is the regeneration and subtraction of interfering data or control signaling from the desired received signal For network-assisted interference cancellation and suppression, different interference mitigation methods can be used. Two kinds of interference cancellation methods are extensively discussed. One is Symbol Level Interference Cancellation (SLIC), and the other is CodeWord level Interference Cancellation (CWIC). For symbol level interference cancellation, the interference signal is regenerated after demodulation and further subtracted from the receiving signal. For codeword level interference cancellation, the interference signal is synthesized after channel decoding, and further subtracted from the receiving signal. The main interference suppression method that has been discussed is Enhanced-IRC, which is an IRC receiver where the interference covariance matrix is parametrically built. There is also a fourth interference mitigation algorithm that has been studied, which is the Maximum Likelihood (ML) receiver, where the best modulation symbol is found according to given interference distribution.

Common for any kind of effective IC algorithm is that it is a soft IC. This means that it will take the certainty of a certain symbol value, or parameter value into account when determining how to regenerate and cancel the transmitted information. For example, when there is a lot of interference or noise on the data stream to be cancelled, the quality of demodulation and/or decoding can be expected to be low, and then typically the regenerated data symbols are created with lower energy to only cancel the certain part of the symbol and not introduce a lot of additional errors. If this is done correctly, then soft IC should never introduce additional errors or interference in the cancellation step. Unfortunately, as discussed under the "Problems with Existing Solutions", there are always cases where the soft IC algorithm is unaware of uncertainty or parameter errors and therefore cannot avoid errors. The soft IC is a generalization of the hard IC, where the symbol regeneration is only to a set of fixed values. In the following discussion we will only use the more general soft IC, but it can easily be translated also to the hard IC case. The ML receiver is another kind of hard decision interference mitigation algorithm that also has a soft counterpart. For ML the hard decision is made over several layers at once. Similar arguments discussed for soft IC also hold for ML receiver, hence in the following discussion about drawbacks for soft IC will also hold for ML receiver. CRS IC is a specific version of hard IC, where the regenerated symbol is only regenerated to already the known symbol value of the pilot.

To facilitate the interference estimation at UE sides, firstly, the network provides to the UEs information about transmission properties of interfering signals, so that the UEs can estimate channel status of the interferers that are intended to be cancelled. Secondly, depending on the UE's capability, the UE may need to know the interfering signals' structure, such as modulation style/feature (for instance, modulation order). The more information that is known regarding this interference signal structure, including the consistency of the structure during a size of scheduling resource granularity, the better the UE can efficiently estimate and synthesize the interfering signal with a low complexity, which is a critical factor for standardization and product's business value.

In short, network assistance is preferably to provide information about the interferers, including
   any information aiding the UEs to infer interfering channel status and
   Interfering signal structure or features.

Network assistance always comes with a cost to the system, though, in that it consumes valuable system resource when being transmitted to the receiver. Therefore, it is expected that a NAICS receiver will have to blindly detect quite a few of the NC parameters, often based on statistics on the received data signal.

In the following, a NAICS receiver is defined as a receiver that is at least capable of mitigating or suppressing PDSCH interference and cancelling CRS interference. Mitigation or cancellation of different types of interference is not precluded. A legacy Rel-11 receiver could be the "baseline receiver" which has been considered for the definition of the performance requirements (see type A performance requirements in 3GPP TS 36.101 V11.8.0 "User Equipment (UE) radio transmission and reception", i.e., Linear MMSE-IRC). Note that in the following, a legacy receiver need not be exactly this baseline receiver, but is a receiver that does not include the principal features of NAICS, i.e. estimating each modulation symbol of interfering PDSCHs and/or channel estimation of individual interferers.

CQI Computation for NAICS

A UE is expected to derive and report CQI to the network with the highest modulation and coding scheme that the UE can guarantee with 10% Block Error Rate (BLER) on the CQI reference resource for the transport format corresponding to the CQI. Hence, when the UE derives CQI it takes into account the channel quality and the receiver capability. Thus, a more advanced receiver is expected to be able to report higher CQI index (higher modulation or higher coding rate) than a less advanced receiver, under the same channel conditions. For a NAICS capable UE, this implies that its mitigation efficiency under radio conditions in the CQI reference resource needs to be determined, in order to be compliant with current CQI definition.

In the following, pre-NAICS CQI corresponds to the case when the CQI is derived based without assuming NAICS functionality (e.g., on the legacy Rel-11 receiver). Post-NAICS CQI corresponds to the case when the CQI is derived by taking the NAICS functionality into account.

Problems with Existing Solutions

A Rel-12 UE could support advanced receivers that allow mitigating or cancelling of the inter-cell or intra-cell interference. It is likely that assistance information will be optionally provided in order to facilitate the advanced receiver operation, in order to limit the complexity of the cancellation/mitigation operation, and in particular of the blind detection of the all the parameters required by NAICS receivers. However, it is not mandated for the network to restrict its behavior to follow the assistance information. When the network does not provide the assistance information or when it does not follow the behavior as defined by the same assistance information the network does not know whether and when the UE applies the advanced receiver.

Assistance information may include Cell ID, $P_A$, $P_B$ parameters, MBSFN configurations, etc., of the candidate interfering cells ($P_A$ and $P_B$ are described in 3GPP TS 36.213 V11.3.0 ("Physical Layer Procedures"), Section 5.2.). In addition, it has been recently agreed that the UE may assume the following "NAICS favorable" conditions whenever it applies NAICS functionality, i.e.:
   The cells are all synchronized.
   The same system bandwidth is used in all the cells.
   The same Cyclic Prefix (CP) is used in all the cells.
   A certain minimum scheduling granularity is at least used in all the cells (1 PRB pair).

Clearly, it is not mandated for the network to restrict its behavior to follow the above mentioned conditions, nor to necessarily follow or to provide the assistance information. When the network does not provide the assistance information, or when it does not follow the behavior as defined above, it is uncertain/unknown:
   whether the UE has the capability to autonomously detect that the above conditions are not respected,
   whether the UE applies the NAICS receiver, and
   under which conditions the UE applies the NAICS receiver.

Because they are often non-linear, the performance of NAICS receivers can vary considerably more with interference characteristics than that of legacy receivers. Consequently, it is unlikely that NAICS receivers will be tested in all relevant combinations of interference and desired signal characteristics (such as modulation state, rank, received signal power, transmission mode, etc.) where performance can substantially vary. Therefore, it is difficult to guarantee that a NAICS UE will have a performance at least as good as a legacy UE. If a NAICS UE continuously assumes that network conditions are suitable for NAICS reception when in fact the network conditions are unsuitable, then the UE will likely have to perform both decodes continuously. Such redundant decoding can increase UE complexity and/or require extra processing that increases current drain on the UE's battery.

It should be noted also that it currently is not clear how channel state feedback information will be defined in the context of NAICS. In case only pre-NAICS CQI feedback is considered in the context of NAICS, it will be assumed that the network can compensate the suboptimal UE CQI feedback by re-optimizing link adaptation using the Outer Loop Link Adaptation (OLLA) technique. However, the network does not have so far any knowledge/guarantee that a NAICS capable UE has enabled or disabled its NAICS receiver at any given time, which could lead to conservative scheduling decisions and hence suboptimal performance.

In transmission modes 1-9, LTE Rel-11 does not constrain how the UE derives interference measurements for computing CQI. Because interference measurements are a core part of NAICS reception and CSI calculation, this makes it difficult to differentiate between how CQI is calculated for post-NAICS and for pre-NAICS reception. As discussed above, the CQI reported with post and pre-NAICS receiver can be significantly different, and so there should be some mechanism that allows the network to know when post-NAICS CQI is reported or not, at least for transmission modes 1-9.

SUMMARY

It is therefore an object to address the technical challenges outlined above. This object and others are achieved by the methods, and the networks nodes, and the UEs according to the independent claims, and by the embodiments according to the dependent claims.

In accordance with a first aspect, a method in a network node serving a User Equipment (UE) capable of network assisted interference cancellation is provided. The method comprises: signaling an indication to the UE indicating whether the UE should enable or disable the network assisted interference cancellation, or whether the UE should autonomously choose to enable or disable the network assisted interference cancellation, for at least one of demodulating the downlink channel or computing the channel state information. The method further comprises: receiving information from the UE about whether the network assisted interference cancellation has been used by the UE for at least one of demodulating the downlink channel and computing the channel state information.

In accordance with a second aspect, a method in a User Equipment (UE) served by a network node is provided. The UE is capable of network assisted interference cancellation, and the method comprises: receiving an indication from the network node indicating whether the UE should enable or disable the network assisted interference cancellation, or whether the UE should autonomously choose to enable or disable the network assisted interference cancellation, for at least one of demodulating the downlink channel or computing the channel state information, and. The method further comprises: signaling information to the network node informing the network node whether the network assisted interference cancellation has been used by the UE for at least one of demodulating the downlink channel and computing the channel state information.

In accordance with a third aspect, a network node configured to serve a User Equipment (UE) capable of network assisted interference cancellation is provided. The network node is further configured to: signal an indication to the UE indicating whether the UE should enable or disable the network assisted interference cancellation, or whether the UE should autonomously choose to enable or disable the network assisted interference cancellation, for at least one of demodulating the downlink channel or computing the channel state information. The network node is further configured to: receive information from the UE about whether the network assisted interference cancellation has been used by the UE for at least one of demodulating the downlink channel and computing the channel state information.

In accordance with a fourth aspect, a User Equipment (UE) configured to be served by a network node and to be capable of network assisted interference cancellation is provided. The UE is further configured to: receive an indication from the network node indicating whether the UE should enable or disable the network assisted interference cancellation, or whether the UE should autonomously choose to enable or disable the network assisted interference cancellation, for at least one of demodulating the downlink channel or computing the channel state information. The UE is further configured to: signal information to the network node informing the network node whether the network assisted interference cancellation has been used by the UE for at least one of demodulating the downlink channel and computing the channel state information.

The above aspects have a number of effects and advantages. The network may control whether the NAICS feature is in use or not, without relying on the UE capability of autonomous detection of whether the deployment/scheduling decisions are favorable for NAICS or not.

Further, the different aspects allow for no network restrictions in terms of scheduling decisions, while still guaranteeing that the performance is no worse than the legacy rel-11 performance. Also, they allow for no network restrictions in terms of deployment conditions, while still guaranteeing that the performance is no worse than the legacy rel-11 performance.

The above aspects also allows for the UE to save battery life, since the UE can rely on the network signaling to switch on/off the advanced receiver, without the need to implement autonomous conditions detection and/or to perform redundant PDSCH decodes.

The proposed UE-to-network signaling allows for the network to know whether an advanced UE has decided to still use the NAICS receiver (i.e. the UE in this case implements an autonomous condition detection or dual decoder capability). Further, it allows for the network to know how to treat the UE reported feedback. Thus, the scheduling for the UE can be optimized. Furthermore, the proposed UE capabilities allow the network to be informed about which type of functionalities the UE can guarantee.

BRIEF DESCRIPTION OF THE DRAWINGS

FIG. 5 illustrates a downlink subframe showing 10 RB pairs and configuration of three ePDCCH regions of size 1 PRB pair each.
FIG. 6 illustrates an example of UE-specific reference symbols used for ePDCCH in LTE.

FIG. 15 is a flowchart schematically illustrating an alternative embodiment of the embodiment disclosed in relation to FIG. 13.

FIG. 16 is a flowchart schematically illustrating an alternative embodiment of the embodiment disclosed in relation to FIG. 14.

FIG. 17 is a flowchart schematically illustrating an embodiment of a method in a UE.

FIG. 18 is a flowchart schematically illustrating an alternative embodiment of the embodiment disclosed in relation to FIG. 17.

FIG. 19 is a flowchart schematically illustrating an alternative embodiment of the embodiment disclosed in relation to FIG. 17.

FIG. 20 is a flowchart schematically illustrating an alternative embodiment of the embodiment disclosed in relation to FIG. 17.

FIG. 21 is a flowchart schematically illustrating an alternative embodiment of the embodiment disclosed in relation to FIG. 17.

FIG. 22 a flowchart schematically illustrating an embodiment of a method in a UE.

DETAILED DESCRIPTION

Figure 1:
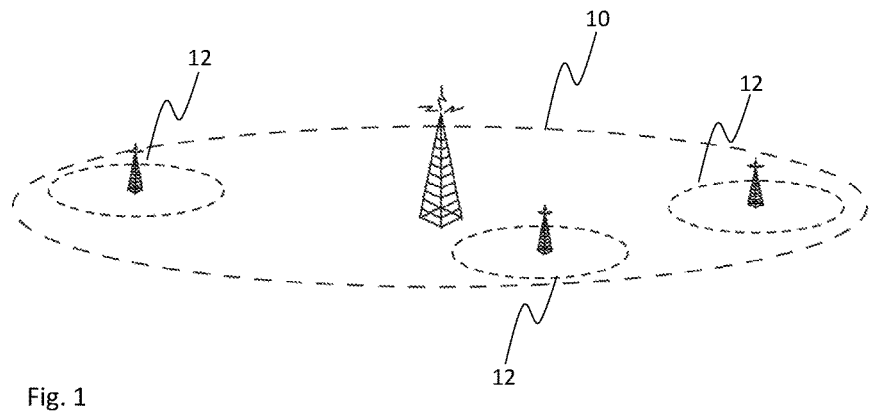
FIG. 1 is a schematic illustration of macro and pico cell deployment.
Figure 2:
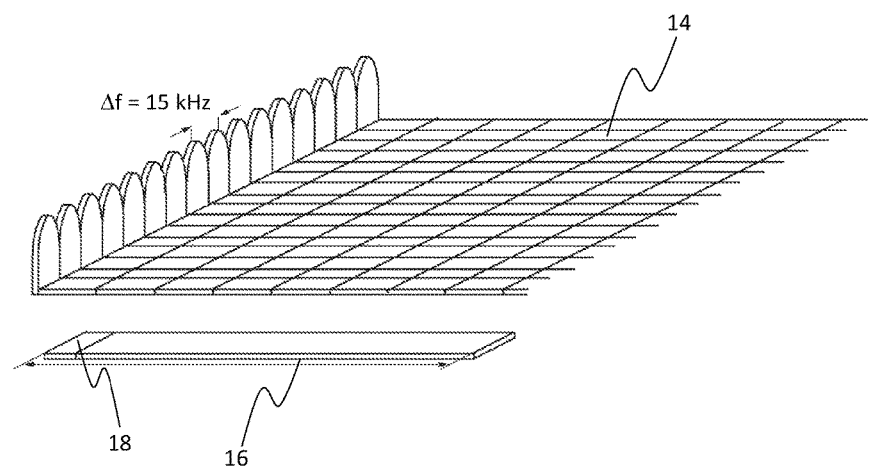
FIG. 2 illustrates a LTE downlink physical resource.
Figure 3:
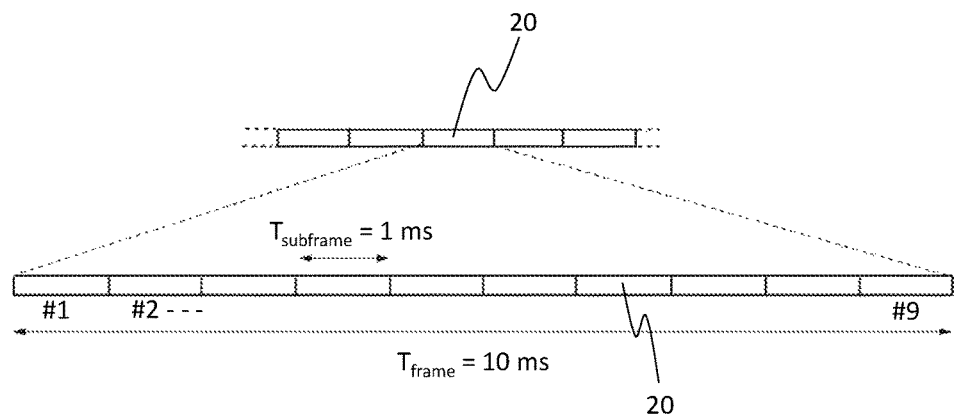
FIG. 3 illustrates a LTE time-domain structure
Figure 4:
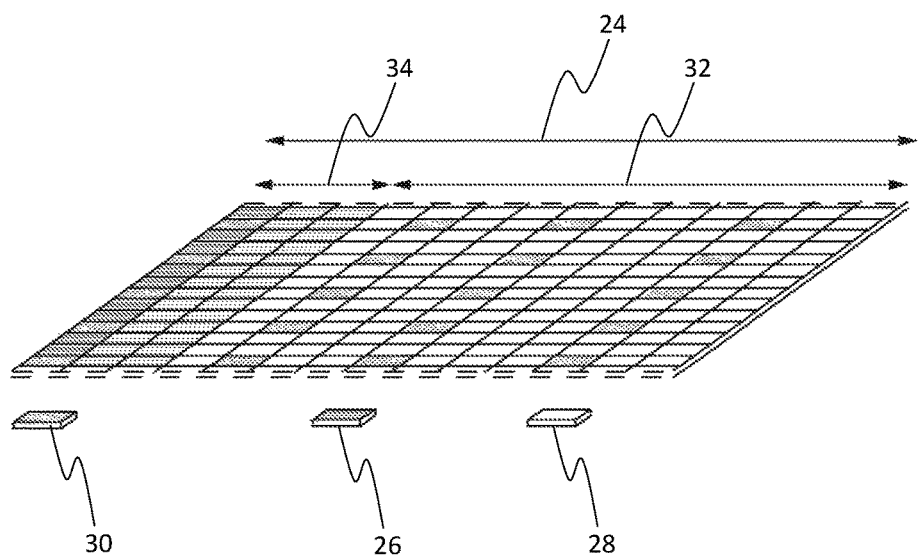
FIG. 4 illustrates the mapping of PDCCH, PDSCH and CRS within an LTE DL subframe.
Figure 7:
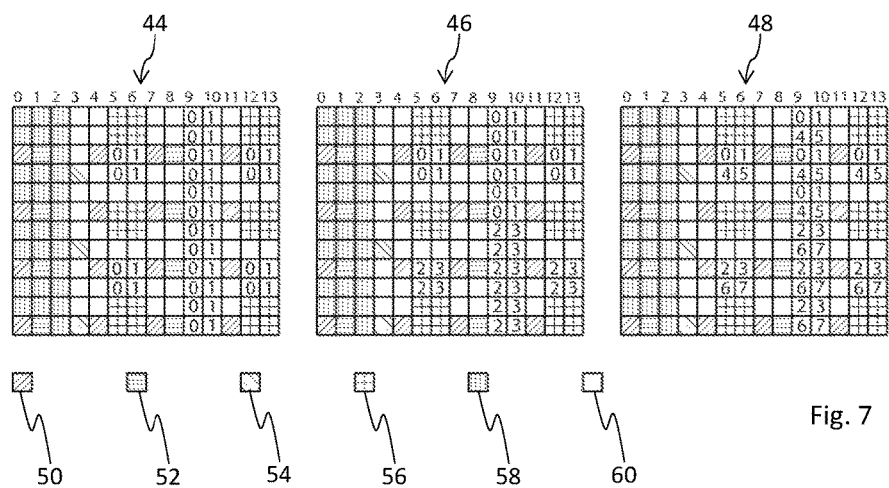
FIG. 7 illustrates a resource element grid over an RB pair.
Figure 8:
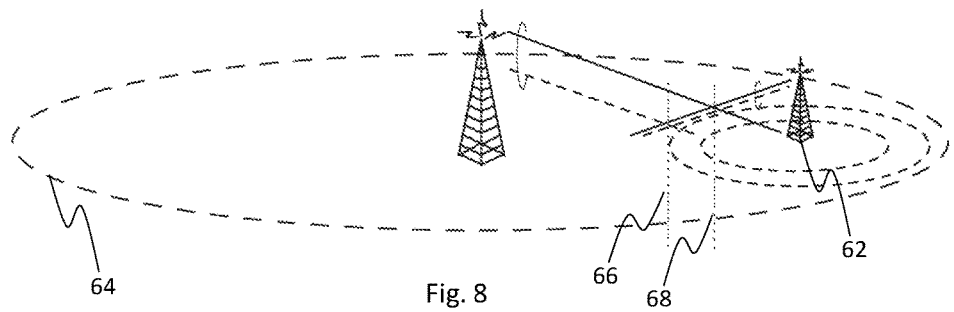
FIG. 8 illustrates uplink and downlink coverage in a mixed cell scenario.
Figure 9:
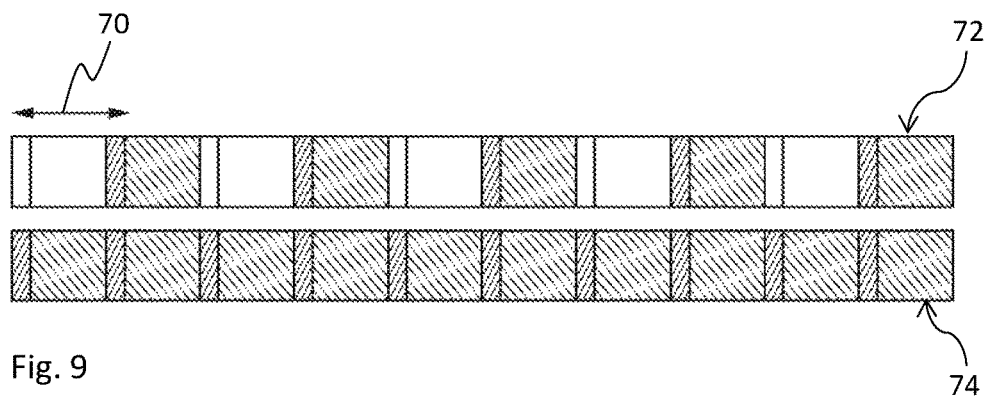
FIG. 9 illustrates using low interference subframes in downlink.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

The proposed definitions below facilitate a clear methodology to compute CQI, while the proposed rules facilitate an autonomous method for the UE to decide, when allowed, whether to compute CQI values according to one of the proposed definition. The techniques and apparatus of the different inventive concepts relate to:

The detailed unified definition of CQI pre and post NAICS.

A rule to select between different CQI computation types. The rule depends, for example, on the transmission mode configured.

The introduction of a signaling from the network to a UE on whether to enable or disable or to allow the UE to autonomously enable or disable the NAICS receiver in the UE for PDSCH demodulation and/or CSI computation The introduction of a signaling from the UE to the network to inform the network whether, when allowed, the UE uses NAICS functionalities to derive CQI values and/or PDSCH demodulation.

UE capability to support CRS-IC for PDSCH demodulation and/or CSI computation and the UE capability to support CRS-IC and PDSCH IC for PDSCH demodulation and/or CSI computation.

For purposes of illustration and explanation only, some embodiments of the present inventive concepts are described herein in the context of operating in or in association with a Radio Access Network (RAN) that communicates over radio communication channels with mobile terminals (also referred to as wireless terminals or UEs).

In some embodiments of a RAN, several base stations may be connected (e.g., by landlines or radio channels) to a Radio Network Controller (RNC). A radio network controller, also sometimes termed a Base Station Controller (BSC), may supervise and coordinate various activities of the plural base stations connected thereto. A radio network controller may be connected to one or more core networks. According to some other embodiments of a RAN, base stations may be connected to one or more core networks without a separate RNC(s) between, for example, with functionality of an RNC implemented at base stations and/or core networks.

As used herein, the terms "mobile terminal," "wireless terminal," "user equipment," or "UE" may be used to refer to any device that receives data from and transm its data to a communication network, any of which may be for example, a mobile telephone ("cellular" telephone), laptop/portable computer, pocket computer, hand-held computer, desktop computer, a machine to machine (M2M) or MTC type device, a sensor with a wireless communication interface, etc. Devices of any of these types may be adapted, according to known techniques and according to the additional techniques disclosed herein, for operation in a device-to-device (D2D) mode, where such operation may include the transmitting and receiving of certain signals that are similar to or identical with corresponding signals used when operating within a cellular network, i.e., in a device-to-base-station operating mode.

Note that although terminology from specifications for the LTE (also referred to as the Evolved Universal Terrestrial Radio Access Network, or E-UTRAN) is used in this disclosure to exemplify embodiments of the inventive concepts, this should not be seen as limiting the scope of the presently disclosed techniques to only this system. Devices designed for use in other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the invention is equally applicable in the uplink.

Definitions

The presently disclosed techniques deal with the concept of enabling and disabling NAICS feature, depending on conditions and rules. First, one needs to define what NAICS Enables and NAICS Disables mean.

NAICS ON means that the UE makes use of a receiver that explicitly estimates the channel of interfering data and/or control signals. Depending on the conditions and UE capabilities, this can be applied for PDSCH demodulation purpose only, or for both demodulation and CSI feedback.

NAICS OFF means that the UE receiver does not explicitly estimate the channel of interfering data and/or control.

UE Capabilities

Following the definitions in the section above, the UE can report several capabilities that can be supported in an optional manner.

The UE can report the full NAICS capability, i.e., the UE reports its capability to support PDSCH interference cancellation and or mitigation and CRS-IC for both PDSCH demodulation and CSI feedback reporting, or partial NAICS capabilities, which can be defined as any combination of the above. Note that it is typically not possible to support PDSCH (or CRS) interference cancellation or mitigation only for CSI feedback reporting (but not for PDSCH demodulation purposes). The support of NAICS as defined above can be defined in an optional manner, i.e. the UE can report optionally the full NAICS capability or any of the partial NAICS capability, or some or all of them could be mandatory. As an example (which is not to be seen as a general limitation) the support of CRS-IC could be mandatory for both PDSCH demodulation and CSI feedback computation, while the support of PDSCH interference cancellation or mitigation could be reported according to a capability signaling in an optional manner.

CQI Computation for NAICS

The following section provides details on the CQI computation for NAICS receivers. A variety of possible factors for the UE to use in CQI computation is considered, including hypotheses of interferer modulation state or rank, and accounting for channel estimation of individual interferers in PDSCH reception performance. The role of CRS-IC is also addressed. This section motivates and provides detailed information justifying the main rule and methodology defined for CQI computation.

In the section "CQI computation for NAICS" above, a generic definition of pre-NAICS CQI and post-NAICS CQI is given. It should be noted that no exact definition of the concepts has been disclosed (reference is here made to R1-141656, "On CSI enhancements for NAICS", Ericsson non-published internal reference implementation). The detailed description of the pre and post NAICS CQI is given here in "DETAILED DESCRIPTION".

The key requirement for identifying post-NAICS vs. pre-NAICS CQI reporting is that the defining attribute(s) should be primary determining factors in the difference of values between post-NAICS and pre-NAICS CQI under a given set of conditions. The gain of NAICS receivers comes from two primary components: estimating each modulation symbol of interfering PDSCHs and improved channel estimation of the interference. In the following, we consider these two components in detail.

In order to estimate each modulation symbol, the UE must hypothesize a modulation state for the modulation symbols in each interfering PDSCH for which NAICS functionality is applied. For example, SLIC receivers estimate each modulation symbol of a layer of an interfering PDSCH, and then subtract it from the received signal. Similarly, Reduced complexity ML (R-ML) receivers jointly estimate each modulation symbol of a layer of an interfering PDSCH and the corresponding modulation symbol of a layer of the serving cell PDSCH.

For CRS-based TMs, channel estimation for PDSCH can be severely degraded if interfering CRS(s) occupy the same resource elements as a serving cell CRS, since there will always be interference on the CRS(s). Channel estimation in NAICS receivers is improved over legacy Rel-11 receivers because the UE is able to directly estimate the channel for one or more interfering physical channels or signals, taking into account that the CRS(s) occupy the same RE(s) and hence can decrease the overall interference on CRS(s). Since both the reception of physical channels and CSI reporting accuracy improve with better channel estimates, improved channel estimation from CRS-IC can be one source of significant gain in NAICS reception of physical channels and CQI reporting accuracy. Therefore, it is important for the network to know whether a UE employs CRS-IC or not (to suppress interference components, especially for CSI computation). This may be straightforward if UEs that are configured for CRS-IC can always be assumed to use it for CQI calculation. However, in Rel-11 CQI tests, for example, the use of CRS-IC for the purpose of CQI computation is only guaranteed under specific conditions. Therefore, according to a preferred embodiment mechanisms are needed to assure that eNB knows when CRS-IC and in general NAICS functionality is used for CSI derivation (to suppress interference components) in NAICS capable UEs in a generic manner. According to one embodiment a UE capability signaling is also proposed to inform the eNodeB about this.

A NAICS UE may improve its suppression of an interfering physical channel by forming an estimate of the interfering covariance matrix using channel estimates of the interferer. For example Enhanced-Linear Minimum Mean Squared Error-Interference Rejection Combining (E-LMMSE-IRC) NAICS receivers use this approach. The maximum link performance gain of E-LMMSE-IRC receivers with respect to Rel-11 LMMSE-IRC may not be as great, but also not as sensitive to interferer parameters, as the receivers that assume values for the modulation states of interferers (such as SLIC or R-ML). According to one embodiment, the UE may or may not differentiate post-NAICS CQI reports from pre-NAICS CQI reports when implementing linear NAICS receivers.

This interfering channel estimation requires knowledge of interferer physical channel and reference signal parameters. The parameters that effectively determine the relative efficacy of NAICS receivers, and therefore the accuracy of CSI reports, are the interfering physical channel's rank, precoding matrix (if any, and for CRS based transmission modes), modulation order and the transmission power of the interferer. All NAICS UEs need to be able to blindly detect these parameters, and so it is possible in theory to use interfering channel estimates in CSI reports.

However, using blind detection to support CQI calculation will add complexity beyond that needed for existing LTE CQI computation. The interference suppression performance of both Rel-11 LMMSE-IRC and NAICS receivers can vary significantly with interferer rank. This means that assuming a fixed value of interferer rank to calculate CQI would lead to inaccurate CQI when the interferer rank varies. Interference covariance estimation methods used in legacy CQI calculations that use CRS can produce a measure of all interference, and can avoid this problem. Therefore, according to a preferred embodiment, the UE may not make a priori assumptions about interference transmission parameters such as rank and may or may not make a priori assumptions about other transmission parameters such as modulation order, in post-NAICS CQI calculations for CRS TMs or for DM-RS transmission modes (up to TM9).

In addition to the above, in transmission mode 10, LTE defines an IMR that the UE uses to determine CSI. Each IMR resource defines a CSI process. Because it is difficult for the UE to independently measure interfering transmissions on one IMR using NAICS approach, it is difficult to use knowledge of interfering PDSCH parameters in CSI (IMR-based) calculations. The UE should therefore assume that the received signal at IMR(s) do not have any structural relationship with received signals at PDSCH RE(s). Therefore, under a preferred embodiment, pre-NAICS CSI feedback is always used for TM10 in NAICS UEs.

The technical background can be summarized as follows:
CQI for non-linear NAICS receivers (such as R-ML or SLIC) is sensitive to the modulation state of interference.

The maximum link level gain of linear NAICS receivers (such as E-IRC) over legacy receivers is not as large or as variable as for non-linear NAICS receivers.

In CRS-based transmission modes or DM-RS-based transmission modes up to TM9, interferer channel estimation through blind detection of an interferer's parameters is possible in linear as well as non-linear NAICS UEs, but it adds complexity to CQI calculation.

CRS-IC is essential for NAICS operation in scenarios such as when CRS occupy the same resource elements, but Rel-11 CQI tests guarantee the use of CRS-IC for the purpose of CQI computation only under specific conditions.

In TM10, the use of IMR makes it infeasible for the UE to apply a NAICS receiver for the purpose of CQI computation, and at best makes CoMP impractical if CSI processes are associated with individual transmission points.

Given these considerations, one can conclude that a unified NAICS CQI calculation behavior for both linear and non-linear receivers can be defined according to the following:
whether the modulation state of an interferer is used (while no a priori assumptions about interference transmission parameters such as rank are assumed),
whether CRS-IC (for suppressing interference component) is accounted for in CSI calculations, and
whether the UE is configured for transmission mode 10.

NAICS CQI Definition and CQI Computation Rule

As mentioned in the section "CQI computation for NAICS" above, Rel-11 CQI requires the UE to report the highest Modulation and Coding Scheme (MCS) it can receive while guaranteeing a certain target BLER. This implies a post-NAICS computation. Therefore, if post-NAICS reception is to be supported in Rel-12, no changes to the CQI definition for transmission modes 1-9 need to be made. However in one embodiment, pre or post-NAICS CQI could be configured by the network or chosen autonomously by the UE according to a specific rule (as detailed in the next section), hence a precise definition of pre-NAICS behavior and post-NAICS is needed following the unified NAICS CQI behavior defined above.

Additionally, the network may need to know if the UE reports pre-NAICS or post-NAICS CSI. Again, if the UE is configured for transmission mode 10, the CQI can be assumed to be pre-NAICS. This can be defined by considering the following rules. Note that the first and second portions of bracketed text are alternatives for when NAICS on/off is explicitly configured and for when the network assistance validity and/or NAICS conditions are signaled, respectively. Also note that the rules defined below (which may be considered in different combinations including where some rules are left out) assume either of the following:

In case of TM1-9, the interference level is measured based on CRS resources. CSI-IM is only defined for TM10.

The CSI-IM concept is extended to TM1-9 so that a CSI-IM for serving cell CRS REs is introduced. In other words, CSI-IM could refer to either the present type of CSI-IM (which constitute an RE pattern similar to a 4 RE pattern in a non-zero power CSI-RS configuration) or corresponds to the CRS REs. This latter kind of CSI-IM could be referred to as CRS CSI-IM to be specific while the former and original CSI-IM could be referred to as CSI-RS CSI-IM. The meaning of CSI-IM may possibly depend on the transmission mode. Additionally a CSI process can also be defined for TM1-9 following the definition in 3GPP TS 36.213 V11.3.0 "Physical Layer Procedures" (only a single process would then be possible in a typical case, although multiple CSI processes for these transmission modes in the future cannot be ruled out).

The rules for reporting CQI can be described by the following:

1. CQI definition is changed to (possibly only for TM10 or for all or some of the transmission modes): A single PDSCH transport block with a combination of modulation scheme and transport block size corresponding to the CQI index, and occupying a group of downlink physical resource blocks termed the CSI reference resource, could be received with a transport block error probability not exceeding 0.1, under the assumption that the interference on the PDSCH REs is as seen on the configured CSI-IM resource for the relevant CSI process.

2. When the NAICS UE reports pre-NAICS CQI (possibly only), CQI is defined according to the following definition (which could now apply to all transmission modes, and not only transmission mode 10):

a. "The UE shall derive the interference measurements for computing the CQI value reported in uplink subframe n and corresponding to a CSI process, based on only the resources belonging to the CSI-IM resource associated with the CSI process. The UE shall assume that the received signals on this CSI-IM resource are interference of unspecified origin with possibly no relation to other transmitted signals", or alternatively b. "The UE shall compute the CQI value without assuming values(s) for the modulation state of physical channel(s) not intended for the UE".

3. When NAICS UE is capable of reporting post-NAICS CQI:

a. When the network assisted interference suppression and cancellation is disabled/deactivated by signaling OR the UE cannot rely on the provided network assistance and/or that the UE may not assume NAICS favorable conditions, the following CQI definition is used:

i. "The UE shall derive the interference measurements for computing the CQI value reported in uplink subframe n and corresponding to a CSI process, based on only the resources belonging to the CSI-IM resource associated with the CSI process. The UE shall assume that the received signals on this CSI-IM resource are interference of unspecified origin with possibly no relation to other transmitted signals", or alternatively ii. "The UE shall compute the CQI value without assuming values(s) for the modulation state of physical channel(s) not intended for the UE.

b. When network assisted interference suppression and cancellation is enabled/activated by signaling OR when the UE can rely on the provided network assistance and/or that the UE may assume NAICS favorable conditions, AND the UE is configured with TM10:

i. "The UE shall derive the interference measurements for computing the CQI value reported in uplink subframe n and corresponding to a CSI process, based on the resources belonging to the CSI-IM resource associated with the CSI process. The UE shall assume that the received signals on this CSI-IM resource are interference of unspecified origin with possibly no relation to other transmitted signals", or alternatively, ii. "The UE shall compute the CQI value without assuming values(s) for the modulation state of physical channel(s) not intended for the UE.

c. When network assisted interference suppression and cancellation is enabled/activated by signaling OR when the UE can rely on the provided network assistance and/or that the UE may assume NAICS favorable conditions, AND the UE is NOT configured with TM10:

i. "the UE shall compute the CQI value (according to the current CQI definition), as a highest CQI index that satisfies the condition that the UE uses NAICS ON condition to receive a single PDSCH transport block with a combination of modulation scheme and transport block size corresponding to the CQI index with a transport block error probability not exceeding a predefined value, e.g. 0.1."

4. The linear NAICS UE may or may not need to differentiate between pre and post-NAICS CQI.

The term "CQI" here can be extended to CSI instead, meaning that reporting of rank and precoder can also be covered by the above description.

Enabling and Disabling NAICS

As discussed in the above sections, it is important that the eNodeB controls whether NAICS feature is ON or OFF. As mentioned already there are several cases that can happen and which are covered by this disclosure. In particular the eNodeB can:

Fully disable, partially enable/disable or fully enable NAICS functionality.

Fully disable NAICS functionality means that the UE in this case will set NAICS receiver OFF according to the definition in section "Definitions" above, i.e., UE does not explicitly estimate the channel of interfering data and/or control signals nor for PDSCH demodulation purposes nor for CSI feedback reporting purposes. The CSI definition in section "NAICS CQI definition and CQI computation rule" above, definition 3.a.i or 3.a.iii, is used. Under this condition, the UE cannot autonomously set NAICS receiver ON and the eNodeB assumes that both PDSCH demodulation and CSI feedback is reported accordingly.

Partially enable/disable NAICS functionality means that, for example, the eNodeB can provide information on whether to enable NAICS receiver only for CRS-IC for both PDSCH demodulation purposes and CSI feedback computation or only for PDSCH demodulation, but disabling the PDSCH interference cancellation or mitigation functionality, or it could enable both CRS-IC and PDSCH interference cancellation or mitigation for PDSCH demodulation and none or only CRS-IC for CSI feedback computation. Depending on the cases the appropriate CQI definition should be used as per section "NAICS CQI definition and CQI computation rule" above. Enabling NAICS functionality means that the UE can assume that the favorable conditions defined in section "Problems with Existing Solutions" above apply.

Fully enable NAICS functionality means that the UE will set its NAICS receiver ON according to the definition in section "Definitions" above, i.e. the UE makes use of a receiver that explicitly estimates the channel of interfering data and control signals. This is applied for both PDSCH demodulation purpose and CSI feedback computation. Enabling NAICS functionality means that the UE can assume that the favorable conditions defined in section "Problems with Existing Solutions" above apply.

The full or partial enabling/disabling procedure of course depends on the UE capability and takes into account the rules defined in section "NAICS CQI definition and CQI computation rule" above.

The eNodeB can also inform the UE that the conditions for full or partial NAICS functionality are not favorable or cannot be guaranteed. In this case several UE behaviors are possible depending on the conditions, i.e. a UE could choose to set it NAICS receiver OFF to limit battery consumption for example or it can decide autonomously to set the NAICS receiver ON or OFF depending on the particular deployment and scheduling conditions (taking into account also the rules defined in section "NAICS CQI definition and CQI computation rule" above). In addition it can also decide whether to activate NAICS receiver for both PDSCH interference cancellation or mitigation and/or CRS-IC and for both PDSCH demodulation and CSI feedback or only PDSCH demodulation. The UE has also to inform the eNodeB about which NAICS functionality is in use in order for the eNodeB to take this into account when defining scheduling strategies for example.

The signaling can be provided semi-statically, e.g., via RRC or via Medium Access Control (MAC) Control Element (CE), or in a more dynamical manner via, e.g., MAC CE, or alternatively in downlink control information on PDCCH or EPDCCH (however this last alternative could lead to a large amount of signaling overhead). Note also that if dynamic signaling has to be provided, a certain communication/cooperation between eNodeBs is needed in order to exchange information about the scheduling choices of the candidate interfering cells. The information exchanged could contain interfering cells scheduling related decisions for example.

eNodeB and UE Methods: Specific Embodiments

The signaling to be described in the following generally speaks in terms of signaling from the network to a UE. But the information content could also be signalled between nodes in the network. Such inter-node signaling could be performed on a standardized protocol such as X2 or in a proprietary manner. Thus if a UE receives signaling from the network involving characteristics of interfering transmissions stemming from other nodes, a related information exchange occurs between the node(s) that are sending the information to the UE and those other nodes, unless the signaling is transmitted directly over the air from each node relevant from an interference perspective for the UE of interest. Such inter-node signaling is also part of the invention even though it is not explicitly stated for each case in the descriptions to follow.

UE Capabilities

Under NAICS functionality, the UE may report different capabilities depending on whether it implements PDSCH IC and/or (only) CRS-IC functionality for demodulation and CSI feedback reporting.

1. According to one embodiment, the UE reports the capability to support PDSCH interference cancellation and or mitigation and CRS-IC for both PDSCH demodulation and CSI feedback reporting.
2. According to an alternative embodiment, the UE reports the capability to support PDSCH interference cancellation and or mitigation and CRS-IC only for PDSCH demodulation, but not for CSI feedback reporting.
3. According to an alternative embodiment, the UE reports the capability to support CRS-IC (but not PDSCH interference cancellation and or mitigation) for both PDSCH demodulation and CSI feedback reporting.
4. According to an alternative embodiment, the UE reports the capability to support CRS-IC (but not PDSCH interference cancellation and or mitigation) only for PDSCH demodulation (but not for CSI feedback reporting).
5. According to one embodiment, these capabilities are optional.
6. According to an alternative embodiment, capability 4 is mandatory and capabilities 1, 2 and 3 are optional
7. According to an alternative embodiment, capability 3 (and 4) is mandatory and capabilities 1, 2 are optional
8. According to an alternative embodiment, capability 2 and 3 (and 4) are mandatory and capabilities 1 is optional
9. According to an alternative embodiment all these capabilities are mandatory and should be supported by the NAICS UE.

eNodeB Method

Under NAICS functionality, a certain set of assistance information will be provided by the network in order to facilitate the UE NAICS operations. The information which is signaled can be provided only to facilitate the PDSCH mitigation/cancellation operation, or for both PDSCH mitigation/cancellation and CRS cancellation.

A certain set of parameters will be assumed for granted by the UE and the remaining parameters will be blindly estimated by the UE. However, so far there are no methodologies for the network to know whether the UE uses a NAICS receiver or a legacy Rel-11 receiver. It is considered to be crucial in this case to know whether and when the UE applies NAICS receiver in order to allow for more conservative or more aggressive (i.e. better optimized) resource scheduling.

1. Under a first embodiment the UE has the capability to support both PDSCH mitigation and/or cancellation and CRS-IC for both PDSCH demodulation and CSI feedback reporting (capability 1 in section "UE Capabilities" above) and eNodeB fully controls the activation and deactivation of the NAICS functionality in the UE depending on if the deployment conditions and the scheduling decisions in the candidate interfering cells result in NAICS favorable conditions (such as those NAICS favorable conditions listed in section "Problems with Existing Solutions" above)
    a. Under the conditions of the first embodiment, the eNodeB controls the full activation and deactivation of the NAICS functionality, e.g. the signaling indicates the UE to enable or disable both PDSCH mitigation/cancellation and CRS cancellation functionality for both demodulation and CSI feedback reporting.
        i. Under the conditions of the first embodiment the UE relies on the eNodeB signaling and disables or enables all NAICS functionalities when it is told via this signaling.
        ii. Under the conditions of the first embodiment, if NAICS PDSCH mitigation/cancellation is disabled using signaling or CSI feedback reporting assuming reception with NAICS functionality is disallowed by rule for the transmission mode in use by the UE, the UE computes the CQI value by following definition 3.a.i or 3.a.ii in section "NAICS CQI definition and CQI computation rule" above.
        iii. Under the conditions of the first embodiment, if NAICS PDSCH mitigation/cancellation is enabled using signaling but CSI feedback reporting assuming reception with NAICS functionality is disallowed by rule for the transmission mode in use by the UE, the UE computes the CQI values(s) by following definition 3.b.i or 3.b.ii in section "NAICS CQI definition and CQI computation rule" above.
            1. In one alternative, CSI feedback reporting assuming reception with NAICS PDSCH mitigation/cancellation is disallowed by rule for transmission mode 10, but supported for at least transmission modes 2, 3, 4, and 6.
            2. In a second alternative, CSI feedback reporting assuming reception with NAICS PDSCH mitigation/cancellation is disallowed by rule for transmission mode 10 but supported any (sub) set of the remaining transmission modes (1-9).
        iv. Under the conditions of the first embodiment, if NAICS PDSCH mitigation/cancellation is enabled and CSI feedback reporting assuming reception with NAICS functionality is allowed by rule for the transmission mode in use by the UE, the UE computes the CQI value by considering the CQI definition as in section "NAICS CQI definition and CQI computation rule" above, definition 3.c.i.
    b. Under an alternative embodiment, under the conditions on the first embodiment, the network will partially activate or deactivate NAICS functionality for both demodulation and CSI feedback reporting.
        i. Under one specific embodiment, the network will activate or deactivate specifically PDSCH mitigation/cancellation functionality while still allowing for CRS-IC functionality.
            1. Under the above mentioned conditions, the UE relies on the eNodeB signaling and disable or enable PDSCH mitigation/cancellation functionalities when it is told via this signaling while it keeps CRS-IC functionality.
        ii. Under another specific embodiment, the network will activate or deactivate specifically any set of physical channel mitigation/cancellation functionality while still allowing for mitigation/cancellation of the remaining interfering physical channels.
1. Under the above mentioned conditions, the UE relies on the eNodeB signaling and disables or enables any set of physical channel mitigation/cancellation functionalities when it is told via this signaling while it keeps mitigating/cancelling the remaining interfering physical channels.
c. Under the conditions of the first embodiment, the eNodeB signals this information in a semi-static way, i.e. via RRC signaling or a MAC control element. For example the network will disable NAICS operation in cases when NAICS favorable conditions no longer apply (such as those NAICS favorable conditions listed in section "Problems with Existing Solutions" above)
i. Under the conditions of this embodiment, a certain communication/cooperation between eNodeB is needed in order to exchange semi-static information of the candidate interfering cells, for the serving cell to be able to disable/enable NAICS functionality in a semi-static manner.

Alternatively:
d. Under the conditions of the first embodiment, the eNodeB signals this information in a dynamic way (preferably via MAC control element, or alternatively in downlink control information on PDCCH or EPDCCH, for example). In this case the network will enable NAICS functionality in a dynamic way following specific conditions in terms of e.g. scheduling granularity, rank, modulations which are not favorable to NAICS gains.
i. Under the conditions of this embodiment, a certain communication/cooperation between eNodeB is needed in order to exchange information about the scheduling choices of the candidate interfering cells, for the serving cell to be able to disable/enable NAICS functionality in a dynamic manner. The information exchanged contains interfering cells scheduling related decisions 2. Under a second embodiment, the UE has the capability to support both PDSCH mitigation and/or cancellation and CRS-IC for both PDSCH demodulation and CSI feedback reporting (capability 1 in section "UE Capabilities" above) and network indicates that the UE cannot rely on the provided network assistance and/or that the UE may not assume NAICS favorable conditions. This is a temporary condition, i.e., when the network indicates that the UE can again rely on the provided network assistance and/or that the UE may assume NAICS favorable conditions, the UE may reuse the parameters previously provided in the network assistance.
a. Under the conditions of the second embodiment, the eNodeB indicates that the unreliable or unfavorable information is related to the whole NAICS functionality, e.g. the signaling indicates the UE that the network assistance is unreliable for both PDSCH mitigation/cancellation and CRS cancellation functionality.
i. Under the condition of this second embodiment, the UE can autonomously detect whether some NAICS gains are still achievable via e.g. a dual decoder capability.
1. Under the conditions above, the UE enables autonomously NAICS functionalities only for PDSCH demodulation
2. Under an alternative embodiment, the UE enables NAICS functionalities for both PDSCH demodulation and CQI computation. The same sub-embodiments as per embodiment 1.a.ii, 1.a.iii and 1.a.iv apply.
ii. Under the condition of this second embodiment, the UE enables and disables its NAICS receiver autonomously for PDSCH demodulation purpose thanks to its e.g. dual decoder capability but it does not assume NAICS functionality for CSI feedback computation (it applies CQI computation as defined in section "NAICS CQI definition and CQI computation rule" above, definition 2.a or 2.b).
iii. Under the condition of this second embodiment, the UE can disable NAICS receiver in order to save complexity and/or current drain for both PDSCH demodulation and CSI feedback computation.
b. Under an alternative embodiment, under the conditions on the second embodiment, the network will indicate that the network assistance is partially not reliable.
i. Under one specific embodiment the network will inform the UE that the assistance information is unreliable or unfavorable for PDSCH mitigation/cancellation functionality while can be still considered as reliable for the purpose of CRS-IC
1. Under the condition above, the UE can autonomously detect whether some NAICS gains are still achievable via e.g. a dual decoder capability.
2. Under the condition above, the UE enables and disables NAICS receiver autonomously for PDSCH demodulation purpose thanks to its e.g. dual decoder capability but it disable NAICS receiver for CSI feedback computation (it applies CQI computation as defined in section "NAICS CQI definition and CQI computation rule" above, definition 2.a or 2.b).
3. Under the condition above, the UE can disable its NAICS receiver in order to save complexity and/or current drain for both PDSCH demodulation and CSI feedback computation
ii. Under another specific embodiment, the network will inform the UE that the assistance information is unreliable for any set of physical channel mitigation/cancellation functionality while can be still considered as reliable for mitigation/cancellation of the remaining interfering physical channels.
1. Under the condition above, the UE can autonomously detect whether some NAICS gains are still achievable via e.g. a dual decoder capability.
2. Under the condition above, the UE enables and disable NAICS receiver autonomously for PDSCH demodulation purpose, e.g. by way of its dual decoder capability, but it disables NAICS receiver for CSI feedback computation (it applies CQI computation as defined in Section 6.1.4 definition 2.a or 2.b).
3. Under the condition above, the UE can disable NAICS receiver in order to save complexity and/or current drain for both PDSCH demodulation and CSI feedback computation
  c. Under the conditions of this second embodiment, the eNodeB signals this information in a dynamic way (preferably via MAC control element, or alternatively in downlink control information on PDCCH or EPDCCH, for example). In this case the UE will not be able to assume for granted that the NAICS favorable conditions are respected by the network.
  d. The eNodeB can, at any time, inform the UE that the normal NAICS assumptions hold true.
    i. Under the above mentioned conditions, the UE enables again NAICS receiver only for the purpose of PDSCH demodulation (applying NAICS CQI computation as per definition in section "NAICS CQI definition and CQI computation rule" above, definition 2.a)
    ii. Under the above mentioned conditions, the UE enables again NAICS receiver for the purpose of PDSCH demodulation and CQI computation (applying post-NAICS CQI computation, as per definition and rule in section "NAICS CQI definition and CQI computation rule" above, definition 3).
  3. Under alternative embodiments depending on which capability the UE reports support of as per section "NAICS CQI definition and CQI computation rule" above, the eNodeB can fully or partially control activation or deactivation of PDSCH cancellation and/or cancellation and or CRS-IC by considering the methods defined above.

UE Method

The UE could still overwrite the eNodeB commands if it is has the capability of detecting whether NAICS receiver can provide gains compared to legacy Rel-11 receiver. Hence the network is not guaranteed that the UE follows the eNodeB signaling and disable (fully or partially) NAICS receiver when requested. Hence:
  1. Under a first embodiment, the UE reports the capability to support PDSCH cancellation and/or cancellation and CRS-IC for both PDSCH demodulation and CSI feedback computation as per capability 1 in section "UE Capabilities" above and informs the eNodeB whether NAICS functionality is used (whenever it is allowed to do so)
    a) Under a preferred sub-embodiment, the UE can indicate that it computes the CQI value assuming NAICS functionality (and NAICS receiver is in used for PDSCH demodulation).
    b) Under the condition of the first embodiment, the UE may indicate that NAICS receiver is used for PDSCH demodulation only.
    c) Under the condition of the first embodiment, the UE can indicate that NAICS functionality is used for any combination above.
    d) Under the conditions of the first embodiment, the UE indicates whether full NAICS functionality is applied (only for demodulation or for both demodulation and CSI computation) or whether a partial NAICS functionality is applied
      1. Under one embodiment, partial NAICS functionality means only CRS cancellation functionality
      2. Under an alternative embodiment, partial NAICS functionality means any set of physical channel mitigation/cancellation functionalities.
    e) Under the conditions of the first embodiment, the UE indicates this information in a dynamic way whenever CSI is reported.
    f) Under the conditions of the first embodiment, the UE informs the network that any form of NAICS receiver is considered for the PDSCH and/or CSI computation.
    g) Any combination of the UE method as described in the first embodiment and eNodeB method applies.
  2. Under an alternative embodiment, the UE reports one of the capabilities capability as defined in section "UE Capabilities" above and informs the eNodeB whether the appropriate NAICS functionality is used (whenever it is allowed to do so), the appropriate sub-embodiments as defined in embodiment 1 would apply.
  3. Under a third embodiment the UE applies certain pre-defined rule for the computation of the CQI. In particular if the UE can report post-NAICS CQI and the eNodeB indicates the UE that it shall apply NAICS ON reception. The same embodiments as described in section "eNodeB method" above (embodiments 1.a.ii, 1.a.iii and 1.a.iv) apply.

Apparatus Embodiments

Figure 10:
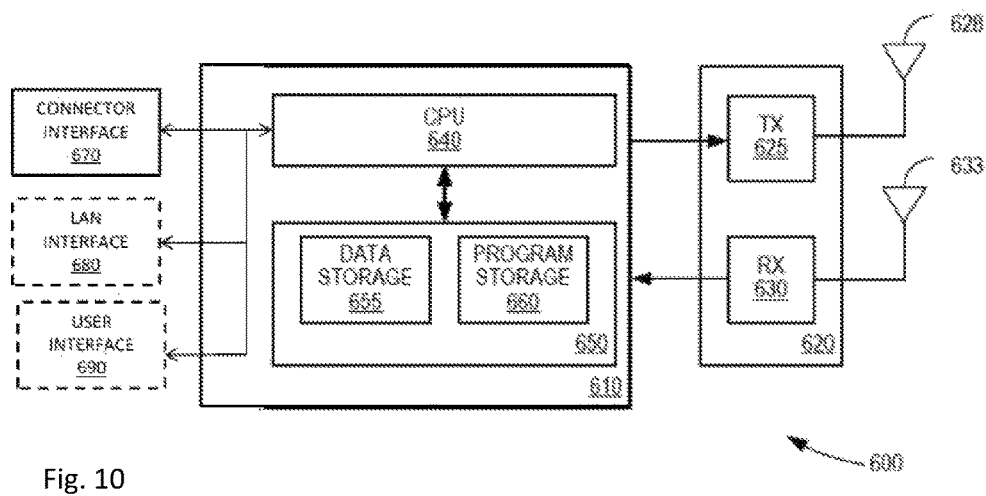
FIG. 10 illustrates features of an example mobile terminal according to several embodiments of the present invention.

Several of the techniques and methods described herein are implemented using radio circuitry, electronic data processing circuitry, and other electronic hardware provided in a mobile terminal. FIG. 10 illustrates features of an example mobile terminal 600 according to several embodiments of the present invention. Mobile terminal 600, which may be a UE configured for operation with an LTE wireless communication network (E-UTRAN), for example, as well as for operation in a device-to-device mode, comprises a radio transceiver circuit 620 configured to communicate with one or more base stations as well as a processing circuit 610 configured to process the signals transmitted and received by the transceiver unit 620. Transceiver circuit 620 includes a transmitter 625 coupled to one or more transmit antennas 628 and receiver 630 coupled to one or more receiver antennas 633. The same antenna(s) 628 and 633 may be used for both transmission and reception.

Receiver 630 and transmitter 625 use known radio processing and signal processing components and techniques, typically according to a particular telecommunications standard such as the 3GPP standards for LTE. Note also that transmitter circuit 620 may comprise separate radio and/or baseband circuitry for each of two or more different types of radio access network, in some embodiments. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 610 comprises one or more processors 640 coupled to one or more memory devices 650 that make up a data storage memory 655 and a program storage memory 660. Processor 640, identified as CPU 640 in FIG. 10, may be a microprocessor, microcontroller, or digital signal processor, in some embodiments. More generally, processing circuit 610 may comprise a processor/firmware combination, or specialized digital hardware, or a combination thereof. Memory 650 may comprise one or several types of memory such as read-only memory (ROM), random-access memory, cache memory, flash memory devices, optical storage devices, etc. Because terminal 600 may support multiple radio access networks, including, for example, a wide-area RAN such as LTE as well as a wireless local-area network (WLAN), processing circuit 610 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 610 include modulation and coding of transmitted signals and the demodulation and decoding of received signals. In several embodiments of the present invention, processing circuit 610 is adapted, using suitable program code stored in program storage memory 660, for example, to carry out one of the techniques specifically described herein, including, for example, the various techniques described in sections "eNodeB method" and "UE method" herein, and variants thereof. Of course, it will be appreciated that not all of the steps of these techniques are necessarily performed in a single microprocessor or even in a single module.

Mobile terminal 600 may further include one or more additional interface circuits, depending on the specific application for the unit. Typically, mobile terminal 670 includes connector interface circuitry 670. In some embodiments, connector interface circuitry 670 may consist of no more than terminals and associated hardware to support charging of an on-board battery (not shown) or to provide direct-current (DC) power to the illustrated circuits. More often, connector interface circuitry 670 further includes a wired communication and/or control interface, which may operate according to proprietary signaling and message formats in some embodiments, or according to a standardized interface definition, in others. For example, connector interface 670 may comprise terminals and associated hardware for support of the well-known Universal Serial Bus (USB) interface. It will be appreciated that while connector interface circuitry 670 includes at least the necessary receiver and driver circuits to support such an interface and may further comprise specialized hardware/firmware, part of the interface functionality may be provided by CPU 640, configured with appropriate firmware and/or software in memory 650, in some embodiments.

Mobile terminal 600 may further comprise local-area network (LAN) interface circuitry 680, in some embodiments. In some embodiments, for example, LAN interface circuitry 680 may provide support for wireless LAN (WLAN) functionality, such as according to the well-known Wi-Fi standards. In some such embodiments, LAN interface circuitry 680 may include an appropriate antenna or antennas. In other embodiments, LAN interface circuitry 680 may make use of one or more common antenna structures that provide reception and/or transmission of WLAN signals as well as wide-area RAN signals. In some embodiments, LAN interface circuitry 680 may be relatively self-contained, in that it includes all of the necessary hardware, firmware, and/or software to carry out the LAN functionality, including the associated protocol stacks. In other embodiments, at least parts of the LAN functionality may be carried out by processing circuit 610.

Still further, mobile terminal 600 may include user-interface circuitry 690, which may include, for example, circuitry and/or associated hardware for one or more switches, pushbuttons, keypads, touch screens, and the like, for user input, as well as one or more speakers and/or displays for output. Of course, some mobile terminals, such as those developed for machine-to-machine applications or for insertion into another device (e.g., a laptop computer) may have only a subset of these input/output devices, or none at all.

Although the described solutions may be implemented in any appropriate type of telecommunication system supporting any suitable communication standards and using any suitable components, network-based embodiments of the solutions and techniques described above may be implemented in one or more nodes of a radio access network (RAN), such as a base station (eNB) in an LTE network.

The network in which these techniques are implemented may further include any additional elements suitable to support communication between wireless devices or between a wireless device and another communication device (such as a landline telephone). Although the illustrated network nodes may represent a network communication device that includes any suitable combination of hardware and/or software, these network nodes may, in particular embodiments, represent a device such as the example network node 900 illustrated in greater detail by FIG. 11. Similarly, although the illustrated base station nodes (e.g., an eNB) may represent network nodes that include any suitable combination of hardware and/or software, these network nodes may, in particular embodiments, represent devices such as the example network node 800 illustrated in greater detail by FIG. 12.

Figure 11:
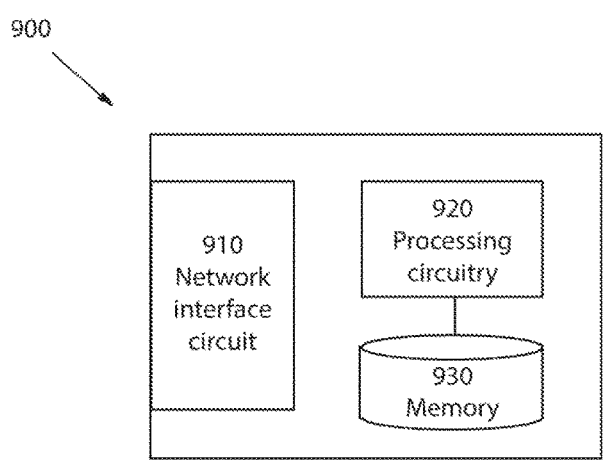
FIG. 11 illustrates an example network node.

As shown in FIG. 11, the example network node 900 includes processing circuitry 920, a memory 930, and network interface circuitry 910. In particular embodiments, some or all of the functionality described above that is provided by a core network node or a node in a RAN may be provided by the processing circuitry 920 executing instructions stored on a computer-readable medium, such as the memory 930 shown in FIG. 11. Alternative embodiments of the network node 900 may include additional components beyond those shown in FIG. 11 that may be responsible for providing certain aspects of the node's functionality, including any of the functionality described above and/or any functionality necessary to support the solutions described above.

Figure 12:
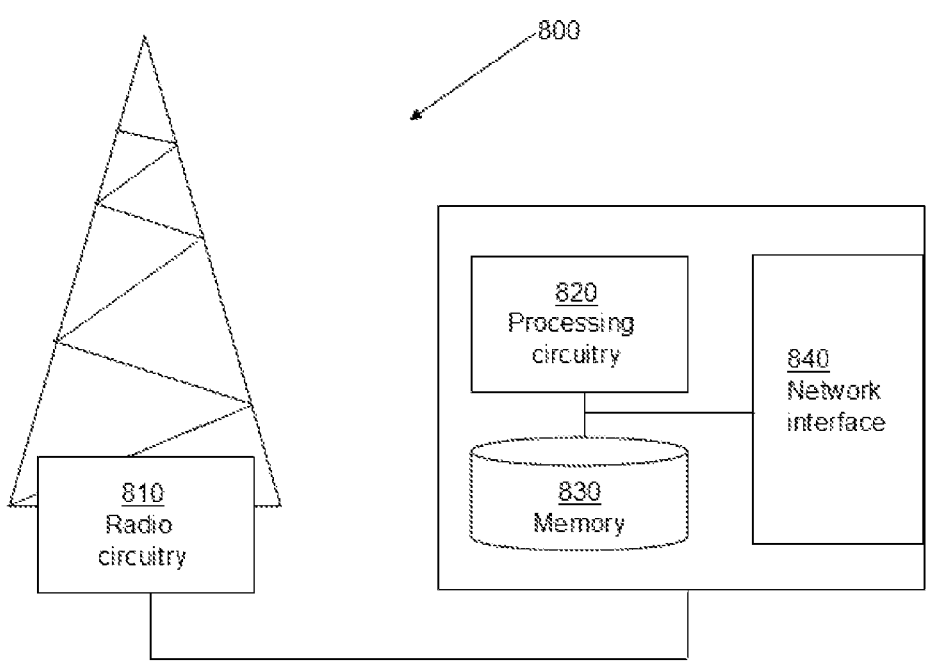
FIG. 12 illustrates an example network node.

As shown in FIG. 12, an example base station 800 includes processing circuitry 820, a memory 830, radio circuitry 810, and at least one antenna. The processing circuitry 820 may comprise RF circuitry and baseband processing circuitry (not shown). In particular embodiments, some or all of the functionality described above as being provided by a mobile base station, a radio network controller, a base station controller, a relay node, a NodeB, an enhanced NodeB, and/or any other type of mobile communications node may be provided by the processing circuitry 820 executing instructions stored on a computer-readable medium, such as the memory 830 shown in FIG. 12. Alternative embodiments of the network node 800 may include additional components responsible for providing additional functionality, including any of the functionality identified above and/or any functionality necessary to support the solution described above.

Figure 13:
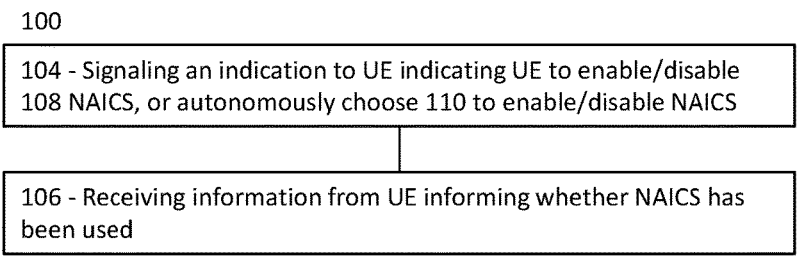
FIG. 13 is a flowchart schematically illustrating an embodiment of a method in a network node.

FIG. 13 is a flowchart schematically illustrating an embodiment of a method in a network node serving a User Equipment (UE) capable of network assisted interference cancellation. The method comprises: signaling 104 an indication to the UE indicating whether the UE should enable or disable 108 the network assisted interference cancellation, or whether the UE should autonomously choose 110 to enable or disable the network assisted interference cancellation, for at least one of demodulating the downlink channel or computing the channel state information. This step essentially encompasses embodiments 1, 2, and 3 in the section "eNodeB method" above. The method further comprises: receiving 106 information from the UE about whether the network assisted interference cancellation has been used by the UE for at least one of demodulating the downlink channel and computing the channel state information. This step essentially encompasses embodiments 1, 2, and 3 in the section "UE method" above.

Figure 14:
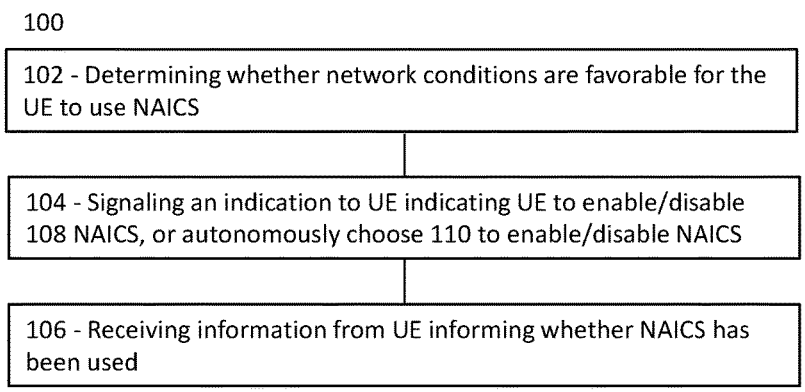
FIG. 14 is a flowchart schematically illustrating an alternative embodiment of the embodiment disclosed in relation to FIG. 13.

FIG. 14 is a flowchart schematically illustrating an alternative embodiment of the embodiment disclosed in relation to FIG. 13, in which the method 100 further comprises prior to signaling 104 the indication to the UE: determining 102 whether network conditions are favorable for the UE to use network assisted interference cancellation for the purpose of at least one of demodulation of a downlink channel and computation of channel state information. Additionally, the indication is based on the determining.

The abovementioned indication may further indicate that the UE should enable or disable one or more optional interference cancellation or mitigation techniques of the network assisted interference cancellation. This embodiment essentially encompasses embodiments 1.a and 1.b in the section "eNodeB method" above. In one embodiment, the indication may further indicate that all optional interference cancellation or mitigation techniques of the network assisted interference cancellation should be disabled. This embodiment essentially encompasses embodiments 1.a in the section "eNodeB method" above. The one or more optional interference cancellation or mitigation techniques may comprise PDSCH interference cancellation and/or mitigation, and CRS interference cancellation. This is also indicated in embodiments 1-3 in the section "eNodeB method" above.

In alternative embodiments, the indication may further indicate that the UE cannot rely on a provided network assistance for one or more optional interference cancellation or mitigation techniques. Alternatively or additionally, the indication may further indicate that the UE may not assume that network assisted interference cancellation is favorable for one or more optional interference cancellation or mitigation techniques. These embodiments are also indicated in embodiment 2 in the section "eNodeB method" above. The indication may relate to all optional interference cancellation or mitigation techniques. This embodiment essentially encompasses embodiment 2.a. in the section "eNodeB method" above. The one or more optional interference cancellation or mitigation techniques may comprise PDSCH interference cancellation and/or mitigation, and CRS interference cancellation. This is also indicated in embodiments 1-3 in the section "eNodeB method" above.

In the alternative embodiments, the indication may further indicate that the UE should autonomously choose whether to disable network assisted interference cancellation for demodulating of the downlink channel, and that it should disable network assisted interference cancellation for computing the channel state information. This is also indicated in embodiments 2.a.ii, 2.b.i.2 and 2.b.ii.2 in the section "eNodeB method" above.

FIG. 15 is a flowchart schematically illustrating an alternative embodiment of the embodiment disclosed in relation to FIG. 13, in which the method further comprises: receiving 112 an indication from the UE indicating whether the network assisted interference cancellation has used one or more optional interference cancellation or mitigation techniques. This is also indicated in embodiment 1.d in the section "UE method" above. The one or more optional interference cancellation or mitigation techniques may comprise PDSCH interference cancellation and/or mitigation, and CRS interference cancellation.

In the above embodiments of a method 100, the network assisted interference cancellation may comprise a blind detection of parameters of an interfering channel.

FIG. 16 is a flowchart schematically illustrating an alternative embodiment of the embodiment disclosed in relation to FIG. 14, in which the method 100 further comprises prior to signaling an indication to the UE: receiving information from the UE indicating whether the UE supports one or more optional interference cancellation or mitigation techniques for at least one of demodulating the downlink channel or computing the channel state information. This is indicated in the embodiments in section "UE Capabilities" above. The one or more optional interference cancellation or mitigation techniques may comprise PDSCH interference cancellation and/or mitigation, and CRS interference cancellation. This is also indicated in the embodiments in section "UE Capabilities" above.

FIG. 17 is a flowchart schematically illustrating an embodiment of a method 200 in a User Equipment (UE) served by a network node, wherein the UE is capable of network assisted interference cancellation. The method comprises: receiving 202 an indication from the network node indicating whether the UE should enable or disable 208 the network assisted interference cancellation, or whether the UE should autonomously choose 210 to enable or disable the network assisted interference cancellation, for at least one of demodulating the downlink channel or computing the channel state information. The method further comprises: signaling 204 information to the network node informing the network node whether the network assisted interference cancellation has been used by the UE for at least one of demodulating the downlink channel and computing the channel state information.

FIG. 18 is a flowchart schematically illustrating an alternative embodiment of the embodiment disclosed in relation to FIG. 17, in which the method 200 comprises prior to signaling 204 information to the network: enabling or disabling 206 network assisted interference cancellation in accordance with the indication.

In the above embodiments of a method 200 in a UE, the indication may further indicate that the UE should enable or disable one or more optional interference cancellation or mitigation techniques of the network assisted interference cancellation. This is indicated in embodiments 1.a and 1.b in section "eNodeB method" above. The indication may further indicate that all optional interference cancellation or mitigation techniques of the network assisted interference cancellation should be disabled. The one or more optional interference cancellation or mitigation techniques may comprise PDSCH interference cancellation and/or mitigation, and CRS interference cancellation. This is also indicated in embodiments 1-3 in the section "eNodeB method" above.

In the embodiments described in relation to FIGS. 19 and 20, the indication may further indicate that the UE cannot rely on a provided network assistance for one or more optional interference cancellation or mitigation techniques. Additionally or alternatively, the indication may further indicate that the UE may not assume that network assisted interference cancellation is favorable for one or more optional interference cancellation or mitigation techniques. These two embodiments are also indicated in embodiment 2 in section "eNodeB method" above. In the above embodiments, the indication may relate to all optional interference cancellation or mitigation techniques. This is also indicated in embodiment 2.a in section "eNodeB method" above. The one or more optional interference cancellation or mitigation techniques may comprise PDSCH interference cancellation and/or mitigation, and CRS interference cancellation. This is also indicated in embodiment 2 in section "eNodeB method" above. The indication may further indicate that the UE should autonomously choose whether to disable network assisted interference cancellation for demodulating the downlink channel, and that it should disable network assisted interference cancellation for computing the channel state information. For example, this is indicated in embodiments 2.a.ii, 2.b.i.2, and 2.b.ii.2 in section "eNodeB method" above.

FIG. 19 is a flowchart schematically illustrating an alternative embodiment of the embodiment disclosed in relation to FIG. 17, in which the method 200 comprises: signaling 212 an indication to the network node indicating whether the network assisted interference cancellation has used one or more optional interference cancellation or mitigation techniques. This is also indicated in embodiment 1.d in section "UE method" above. The one or more optional interference cancellation or mitigation techniques may comprise PDSCH interference cancellation and/or mitigation, and CRS interference cancellation. This is indicated in embodiment 1 in section "UE method" above.

In the above embodiments relating to a method 200 in a UE, the network assisted interference cancellation may comprise a blind detection of parameters of an interfering channel.

FIG. 20 is a flowchart schematically illustrating an alternative embodiment of the embodiment disclosed in relation to FIG. 17, in which the method 200 further comprises prior to receiving 202 an indication from the network node: signaling 214 information to the network node indicating whether the UE supports one or more optional interference cancellation or mitigation techniques for at least one of demodulating the downlink channel or computing the channel state information. The one or more optional interference cancellation or mitigation techniques may comprise PDSCH interference cancellation and/or mitigation, and CRS interference cancellation. For example, these embodiments are indicated in section "UE Capabilities" above.

FIG. 21 is a flowchart schematically illustrating an alternative embodiment of the embodiment disclosed in relation to FIG. 17, in which the method 200 further comprises: computing 216 the channel state information, and reporting 218 the channel state information to the network node.

In the embodiment of FIG. 21, the channel state information may comprise a channel quality indicator value. This may also be the case in all embodiments described herein. Computing 216 the channel state information may comprise: computing the channel quality indicator based on a resource or resources belonging to an interference measurement resource associated with the channel state information, or computing the channel quality indicator value without assuming a value for a modulation state of a physical channel not intended for the UE. Reporting 218 the channel state information may comprise: reporting the channel quality indicator value. This is also indicated under items 2.a-b, 3a.i-ii, 3.b.i-ii in section "NAICS CQI definition and CQI computation rule" above.

In computing the channel quality indicator based on a resource or resources belonging to an interference measurement resource, the UE may assume that the received signals on the interference measurement resource are at least one of interference of unspecified origin or without any relation to other transmitted signals.

The computing of the channel quality indicator value may be performed as if network assisted interference cancellation is not used by the UE. Additionally or alternatively, the UE may be configured for transmission mode 1-9. This is also indicated under item 2.a-b and partly under 3.a.i-ii in section "NAICS CQI definition and CQI computation rule" above.

FIG. 22 is a flowchart schematically illustrating an embodiment of a method 200' in a User Equipment (UE) served by a network node, wherein the UE is capable of network assisted interference cancellation. The method comprises: receiving 220' signaling configuring the UE for operation in at least one of LTE transmission modes 1 through 9; receiving 222' network assisted interference cancellation signaling; computing 216' the channel state information, and reporting 218' the channel state information to the network node. The method may comprise any or any combination of features of the computing 216 and reporting 218 that are disclosed in relation to the embodiment of FIG. 21.

Figure 23:
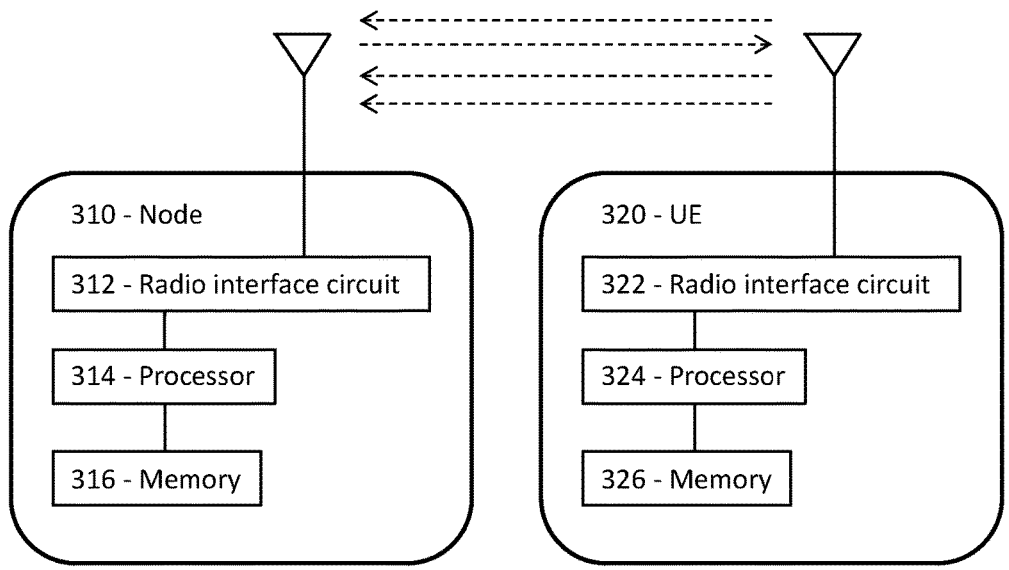
FIG. 23 illustrates embodiments of a UE and a network node configured to serve the UE.

FIG. 23 illustrates an embodiment of a network node 310 configured to serve a User Equipment (UE) 320 capable of network assisted interference cancellation. The network node 310 may be further configured to perform any of the steps or comprise any of the features described above in relation to FIGS. 15-18. In one embodiment, the network node 310 is configured to: signal 104 an indication to the UE 320 indicating whether the UE 320 should enable or disable 108 the network assisted interference cancellation, or whether the UE 320 should autonomously choose 110 to enable or disable the network assisted interference cancellation, for at least one of demodulating the downlink channel or computing the channel state information. The network node 310 is further configured to: receive 106 information from the UE 320 about whether the network assisted interference cancellation has been used by the UE 320 for at least one of demodulating the downlink channel and computing the channel state information.

In one embodiment, the network node 310 is further configured to: determine 102 prior to signaling 104 the indication to the UE 320 whether network conditions are favorable for the UE 320 to use network assisted interference cancellation for the purpose of at least one of demodulation of a downlink channel and computation of channel state information, and wherein the indication is based on the determining.

In the above embodiments of a network node 310, the indication may further indicate that the UE 320 should enable or disable one or more optional interference cancellation or mitigation techniques of the network assisted interference cancellation. The indication may further indicate that all optional interference cancellation or mitigation techniques of the network assisted interference cancellation should be disabled. The one or more optional interference cancellation or mitigation techniques may comprise PDSCH interference cancellation and/or mitigation, and CRS interference cancellation.

In alternative embodiments of a network node 310, the indication may further indicate that the UE 320 cannot rely on a provided network assistance for one or more optional interference cancellation or mitigation techniques. Alternatively, the indication may further indicate that the UE 320 may not assume that network assisted interference cancellation is favorable for one or more optional interference cancellation or mitigation techniques. In these embodiments, the indication may relate to all optional interference cancellation or mitigation techniques. Additionally, or alternatively the one or more optional interference cancellation or mitigation techniques may comprise PDSCH interference cancellation and/or mitigation, and CRS interference cancellation.

The indication may additionally or alternatively further indicates that the UE 320 should autonomously choose whether to disable network assisted interference cancellation for demodulating of the downlink channel, and that it should disable network assisted interference cancellation for computing the channel state information.

In the embodiments of a network node 310, it may be further configured to: receive 112 an indication from the UE 320 indicating whether the network assisted interference cancellation has used one or more optional interference cancellation or mitigation techniques. The one or more optional interference cancellation or mitigation techniques may comprise PDSCH interference cancellation and/or mitigation, and CRS interference cancellation.

In one alternative embodiment, the network assisted interference cancellation may comprise a blind detection of parameters of an interfering channel.

In one embodiment, the network node 310 may additionally or alternatively configured to: receive information from the UE 320 prior to signaling an indication to the UE 320, wherein the information indicates whether the UE 320 supports one or more optional interference cancellation or mitigation techniques for at least one of demodulating the downlink channel or computing the channel state information. In this embodiment, the one or more optional interference cancellation or mitigation techniques comprises PDSCH interference cancellation and/or mitigation, and CRS interference cancellation.

FIG. 23 also illustrates an embodiment of a User Equipment (UE) 320 configured to be served by the network node 310 and to be capable of network assisted interference cancellation. The UE 320 may be further configured to perform any of the steps or comprise any of the features described above in relation to FIGS. 19-22. In one embodiment, the UE is further configured to: receive 202 an indication from the network node 310 indicating whether the UE 320 should enable or disable 208 the network assisted interference cancellation, or whether the UE 320 should autonomously choose 210 to enable or disable the network assisted interference cancellation, for at least one of demodulating the downlink channel or computing the channel state information. The UE 320 is further configured to signal 204 information to the network node 310 informing the network node 310 whether the network assisted interference cancellation has been used by the UE 320 for at least one of demodulating the downlink channel and computing the channel state information.

In one embodiment, the UE 320 is further configured to: enable 206 or disable network assisted interference cancellation in accordance with the indication, wherein the enabling is prior to signaling information to the network.

In the above embodiments of the UE 320, the indication further may indicate that the UE 320 should enable or disable one or more optional interference cancellation or mitigation techniques of the network assisted interference cancellation. The indication may further indicate that all optional interference cancellation or mitigation techniques of the network assisted interference cancellation should be disabled. The one or more optional interference cancellation or mitigation techniques may comprise PDSCH interference cancellation and/or mitigation, and CRS interference cancellation.

The indication may further indicate that the UE 320 cannot rely on a provided network assistance for one or more optional interference cancellation or mitigation techniques. Additionally or alternatively, the indication may further indicate that the UE 320 may not assume that network assisted interference cancellation is favorable for one or more optional interference cancellation or mitigation techniques. In these embodiments, the indication may relate to all optional interference cancellation or mitigation techniques. Additionally or alternatively, the one or more optional interference cancellation or mitigation techniques may comprise PDSCH interference cancellation and/or mitigation, and CRS interference cancellation. Additionally or alternatively, the indication may further indicate that the UE 320 should autonomously choose whether to disable network assisted interference cancellation for demodulating the downlink channel, and that it should disable network assisted interference cancellation for computing the channel state information.

In one embodiment, the UE 320 may additionally or alternatively further be configured to: signal 212 an indication to the network node 310 indicating whether the network assisted interference cancellation has used one or more optional interference cancellation or mitigation techniques. The one or more optional interference cancellation or mitigation techniques may comprises PDSCH interference cancellation and/or mitigation, and CRS interference cancellation.

In the above embodiments of a UE 320, the network assisted interference cancellation may comprise a blind detection of parameters of an interfering channel.

In one embodiment, the UE 320 may additionally or alternatively further be configured to: signal 214 information to the network node 310 prior to receiving 202 an indication from the network node 310, wherein the information indicates whether the UE 320 supports one or more optional interference cancellation or mitigation techniques for at least one of demodulating the downlink channel or computing the channel state information. In this embodiment, the one or more optional interference cancellation or mitigation techniques may comprise PDSCH interference cancellation and/or mitigation, and CRS interference cancellation.

In one embodiment, a computer program for use in a network node 310 is provided. The network node 310 is configured to serve a User Equipment (UE) 320 that is capable of network assisted interference cancellation. The network node 310 is further configured and to receive 106 information from the UE 320 about whether the network assisted interference cancellation has been used by the UE for at least one of demodulating the downlink channel and computing the channel state information. The computer program comprises instructions that, when executed by a processing circuit 314 of the network node 310 causes the network node 310 to: signal 104 an indication to the UE indicating whether the UE should enable or disable 108 the network assisted interference cancellation, or whether the UE should autonomously choose 110 to enable or disable the network assisted interference cancellation, for at least one of demodulating the downlink channel or computing the channel state information.

The computer program for use in a network node 310 may comprise instructions that causes the network node 310 to perform any of the steps described above in relations to FIGS. 15-18, and/or causes any of the features described above in relations to FIGS. 15-18.

In one embodiment, a computer-readable medium 316 is provided storing the computer program for use in a network node 310. The computer-readable medium 136 may be a non-transitory memory.

In one embodiment of the network node 310 shown in FIG. 23, the network node comprises a processor 314, a memory 316, and a radio interface or transceiver circuit 312 configured to serve a User Equipment (UE) 320 that is capable of network assisted interference cancellation. The memory 316 contains instructions executable by the processor 314 whereby the network node 310 is operative to: signaling 104 an indication to the UE indicating whether the UE 320 should enable or disable 108 the network assisted interference cancellation, or whether the UE 320 should autonomously choose 110 to enable or disable the network assisted interference cancellation, for at least one of demodulating the downlink channel or computing the channel state information. The memory 316 further contains instructions executable by the processor 314 whereby the network node 310 is operative to: receiving 106 information from the UE about whether the network assisted interference cancellation has been used by the UE 320 for at least one of demodulating the downlink channel and computing the channel state information.

In one embodiment, a computer program for use in a User Equipment (UE) 320 configured to be served by a network node 310 is provided. The UE 320 is further configured to be capable of network assisted interference cancellation, and to receive 202 an indication from the network node 310 indicating whether the UE 320 should enable or disable 208 the network assisted interference cancellation, or whether the UE should autonomously choose 210 to enable or disable the network assisted interference cancellation, for at least one of demodulating the downlink channel or computing the channel state information. The computer program comprises instructions that, when executed by a processing circuit 324 of the UE 320, causes the UE to: signal 204 information to the network node 310 informing the network node 310 whether the network assisted interference cancellation has been used by the UE for at least one of demodulating the downlink channel and computing the channel state information.

The computer program for use in the UE 320 may comprise instructions that causes the network node 310 to perform any of the steps described above in relations to FIGS. 19-22, and/or causes any of the features described above in relations to FIGS. 19-22.

In one embodiment, a computer-readable medium 326 is provided storing the computer program for use in a UE 320. The computer-readable medium 136 may be a non-transitory memory.

In one embodiment of the User Equipment (UE) 320 shown in FIG. 23, the UE comprises a processor 324, a memory 326, and a radio interface or transceiver circuit 322 configured to be served by a network node 310. The memory 326 contains instructions executable by the processor 324 whereby the UE 320 is capable of network assisted interference cancellation and operative to: receiving 202 an indication from the network node 310 indicating whether the UE 320 should enable or disable 208 the network assisted interference cancellation, or whether the UE 320 should autonomously choose 210 to enable or disable the network assisted interference cancellation, for at least one of demodulating the downlink channel or computing the channel state information. The memory 326 further contains instructions executable by the processor 324 whereby the UE 320 is operative to: signaling 204 information to the network node 310 informing the network node 310 whether the network assisted interference cancellation has been used by the UE 320 for at least one of demodulating the downlink channel and computing the channel state information.

Figure 24:
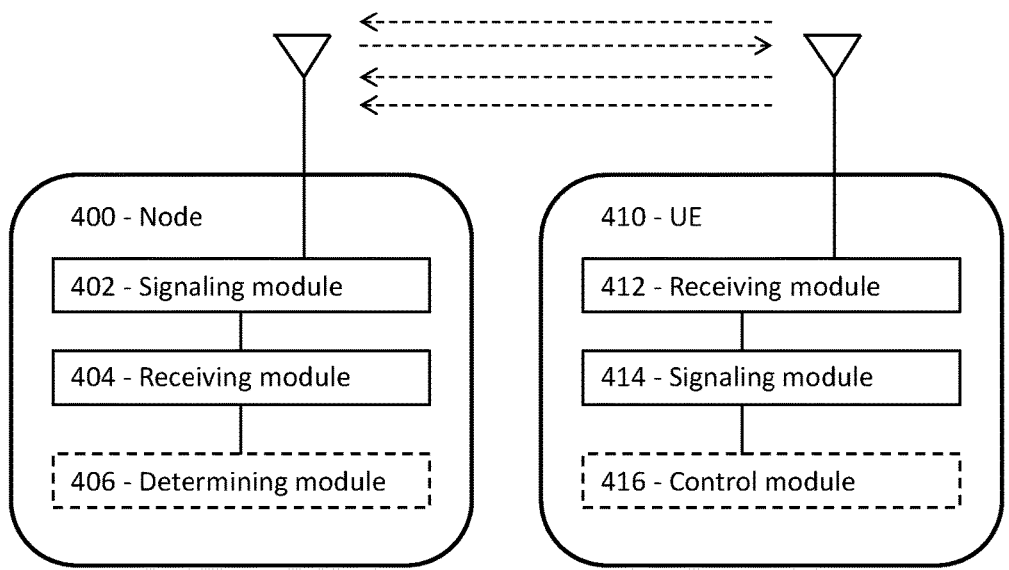
FIG. 24 illustrates embodiments of a UE and a network node configured to serve the UE.

In one embodiment shown in FIG. 24, a network node 400 for serving a User Equipment (UE) 410 capable of network assisted interference cancellation is provided. The network node 400 comprises: a signaling module 402 adapted to signal 104 an indication to the UE indicating whether the UE 410 should enable or disable 108 the network assisted interference cancellation, or whether the UE 410 should autonomously choose 110 to enable or disable the network assisted interference cancellation, for at least one of demodulating the downlink channel or computing the channel state information. The network node further comprises: a receiving module 404 adapted to receive 106 information from the UE about whether the network assisted interference cancellation has been used by the UE 410 for at least one of demodulating the downlink channel and computing the channel state information.

In one embodiment the network node 400 further comprises: a determining module 406 (indicated by dashed lines in FIG. 24) adapted to, prior to signaling 104 the indication to the UE 410, determine 102 whether network conditions are favourable for the UE 410 to use network assisted interference cancellation for the purpose of at least one of demodulation of a downlink channel and computation of channel state information. The signaling module 402 is further adapted to base the indication on the determining.

The receiving module 404 may further be adapted to receive 112 an indication from the UE 410 indicating whether the network assisted interference cancellation has used one or more optional interference cancellation or mitigation techniques. Alternatively or additionally, the receiving module 404 may be further adapted to receive information from the UE indicating whether the UE supports one or more optional interference cancellation or mitigation techniques for at least one of demodulating the downlink channel or computing the channel state information.

In one embodiment shown in FIG. 24, a User Equipment (UE) 410 for being served by a network node 400 and capable of network assisted interference cancellation is provided. The UE 410 comprises: a receiving module 412 adapted to receive 202 an indication from the network node indicating whether the UE should enable or disable 208 the network assisted interference cancellation, or whether the UE should autonomously choose 210 to enable or disable the network assisted interference cancellation, for at least one of demodulating the downlink channel or computing the channel state information. The UE 410 further comprises: a signaling module 414 adapted to signal 204 information to the network node informing the network node whether the network assisted interference cancellation has been used by the UE for at least one of demodulating the downlink channel and computing the channel state information.

In one embodiment the UE 410 further comprises: a control module 416 (indicated by dashed lines in FIG. 24) adapted to enabling or disabling 206 network assisted interference cancellation in accordance with the indication prior to the signaling unit 414 signaling 204 information to the network node.

The signaling module 414 may further be adapted to signal 212 an indication to the network node indicating whether the network assisted interference cancellation has used one or more optional interference cancellation or mitigation techniques. Additionally or alternatively, the signaling module 414 may further be adapted to, prior to receiving 202 an indication from the network node, signal 214 information to the network node indicating whether the UE supports one or more optional interference cancellation or mitigation techniques for at least one of demodulating the downlink channel or computing the channel state information.

Example Embodiments

It will be appreciated by the person of skill in the art that various modifications may be made to the above described embodiments without departing from the scope of the presently disclosed techniques. For example, it will be readily appreciated that although the above embodiments are described with reference to parts of a 3GPP network, embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above. Some of these and other embodiments are summarized below. It will be appreciated that any of the embodiments provided below may be combined with one or more of the other embodiments, and/or may be modified according to one or more of the detailed techniques described above. More generally, because it is not possible, of course, to describe every conceivable combination of components or techniques, those skilled in the art will appreciate that the presently disclosed techniques can be implemented in other ways than those specifically set forth herein. The present embodiments are thus to be considered in all respects as illustrative and not restrictive.

In a first example embodiment, a method in a UE operating in a wireless network comprises: signaling receiver capability information to the wireless network, the receiver capability information indicating whether the UE supports one or more optional interference cancellation or interference mitigation capabilities. The receiver capability information may indicate whether the UE supports one or more of: PDSCH interference cancellation and/or mitigation; and CRS-IC for PDSCH demodulation and CSI feedback reporting.

In a second example embodiment, a method in a network node of a wireless comprises: receiving receiver capability information from a UE, the receiver capability information indicating whether the UE supports one or more optional interference cancellation or interference mitigation capabilities; and performing one or more scheduling operations or interference cancellation assistance operations for the UE, based on the received receiver capability information. The receiver capability information may indicate whether the UE supports one or more of: PDSCH interference cancellation and/or mitigation; and CRS-IC for PDSCH demodulation and CSI feedback reporting.

In a third example embodiment, a method in a user equipment (UE) operating in a wireless network comprises: sending CSI information to the wireless network; and signaling CSI derivation information to the wireless network, the CSI derivation information indicating whether the CSI information was derived using an optional interference cancellation and/or mitigation technique. The CSI derivation information may identify a type of optional interference cancellation and/or mitigation technique.

In a fourth example embodiment, a method in a network node of a wireless network comprises: receiving CSI information from a UE; receiving CSI derivation information from the UE, the CSI derivation information indicating whether the CSI information was derived using an optional interference cancellation and/or mitigation technique; and processing the received CSI information based on the received CSI derivation information. The receiver capability information may indicate whether the UE supports one or more of: PDSCH interference cancellation and/or mitigation; and CRS-IC for PDSCH demodulation and CSI feedback reporting.

In a fifth example embodiment, a method in a UE operating in a wireless network method comprises: determining whether CSI information should be derived based on an optional interference cancellation or mitigation technique; and, based on said determining, selectively deriving CSI information based on the optional interference cancellation or mitigation technique and reporting the derived CSI information to the wireless network. Determining whether CSI information should be derived based on an optional interference cancellation or mitigation technique may comprise receiving an indication of whether CSI information should be derived based on an optional interference cancellation or mitigation technique from the wireless network. Alternatively, determining whether CSI information should be derived based on an optional interference cancellation or mitigation technique may comprise evaluating a rule that depends on one or more of: a transmission mode for the UE; whether the optional interference cancellation or mitigation technique is enabled; and whether the UE can assume that certain conditions suitable for the interference cancellation or mitigation technique apply.

In a sixth example embodiment a method in a network node of a wireless network comprises: determining whether CSI information received from a UE is derived based on an optional interference cancellation or mitigation technique; and processing CSI information received from the UE, based on said determining. Determining whether CSI information received from a UE may be derived based on an optional interference cancellation or mitigation technique comprises sending an indication of whether CSI information should be derived based on an optional interference cancellation or mitigation technique to the wireless network. Alternatively, the determining whether CSI information received from a UE may be derived based on an optional interference cancellation or mitigation technique comprises evaluating a rule that depends on one or more of: a transmission mode for the UE; whether the optional interference cancellation or mitigation technique is enabled; and whether the UE can assume that certain conditions suitable for the interference cancellation or mitigation technique apply.

In a seventh example embodiment a method in a network node of a wireless network comprises: signaling a UE an indication that the UE should enable, partially enable, or fully enable one or more optional interference cancellation or mitigation techniques. The signaling may based on receiver capability information received from the UE according to the second example embodiment, or the optionally limited second example embodiment.

In an eighth example embodiment a method in a UE operating in a wireless network comprises: receiving, from the wireless network, an indication of whether the UE should enable, partially enable, or fully enable one or more optional interference cancellation or mitigation techniques. Said indication may be received subsequent to signaling receiver capability information according to the first example embodiment, or the optionally limited first example embodiment.

In a ninth example embodiment a network node apparatus comprises one or more processing circuits adapted to carry out one or more of the methods of the second example embodiment, the optionally limited second example embodiments, the fourth example embodiment, the optionally limited fourth example embodiments, the sixth example embodiment, the optionally limited sixth example embodiments, the seventh example embodiment, the optionally limited seventh example embodiments.

In a tenth example embodiment a mobile terminal apparatus comprises one or more processing circuits adapted to carry out one or more of the methods of the first example embodiment, the optionally limited first example embodiments, the third example embodiment, the optionally limited third example embodiments, the fifth example embodiment, the optionally limited fifth example embodiments, the eighth example embodiment, and the optionally limited eighth example embodiments.

In an eleventh example embodiment a mobile terminal apparatus comprises means for signaling receiver capability information to a wireless network, the receiver capability information indicating whether the UE supports one or more optional interference cancellation or interference mitigation capabilities.

In a twelfth example embodiment a mobile terminal apparatus comprises: means for sending CSI information to the wireless network; and means for signaling CSI derivation information to the wireless network, the CSI derivation information indicating whether the CSI information was derived using an optional interference cancellation and/or mitigation technique.

In a thirteenth example embodiment a mobile terminal apparatus comprises: means for determining whether CSI information should be derived based on an optional interference cancellation or mitigation technique; and means, responsive to said means for determining, for selectively deriving CSI information based on the optional interference cancellation or mitigation technique and reporting the derived CSI information to the wireless network.

In a fourteenth example embodiment a mobile terminal apparatus comprises: receiving, from the wireless network, an indication of whether the UE should enable, partially enable, or fully enable one or more optional interference cancellation or mitigation techniques.

In a fifteenth example embodiment a network node apparatus comprises: means for receiving receiver capability information from a UE, the receiver capability information indicating whether the UE supports one or more optional interference cancellation or interference mitigation capabilities; and means for performing one or more scheduling operations or interference cancellation assistance operations for the UE, based on the received receiver capability information.

In a sixteenth example embodiment a network node apparatus comprises: means for receiving CSI information from a UE; means for receiving CSI derivation information from the UE, the CSI derivation information indicating whether the CSI information was derived using an optional interference cancellation and/or mitigation technique; and means for processing the received CSI information based on the received CSI derivation information.

In a seventeenth example embodiment a network node apparatus comprises: means for determining whether CSI information received from a UE is derived based on an optional interference cancellation or mitigation technique; and means for processing CSI information received from the UE, based on said determining.

In an eighteenth example embodiment a network node apparatus comprises: means for signaling, to a UE, an indication that the UE should enable, partially enable, or fully enable one or more optional interference cancellation or mitigation techniques.

The invention claimed is:

1. A method in a network node serving a User Equipment (UE) capable of network-assisted interference cancellation, the method comprising
signaling an indication to the UE indicating whether the UE should enable or disable the network-assisted interference cancellation, or whether the UE should autonomously choose to enable or disable the network-assisted interference cancellation, for at least one of demodulating the downlink channel or computing the channel state information; and
receiving information from the UE about whether the network-assisted interference cancellation has been used by the UE for at least one of demodulating the downlink channel and computing the channel state information,
wherein the indication further indicates that the UE should autonomously choose whether to disable network-assisted interference cancellation for demodulating of the downlink channel, and that it should disable network-assisted interference cancellation for computing the channel state information.

2. The method of claim 1, further comprising, prior to signaling the indication to the UE:
determining whether network conditions enable the UE to use network-assisted interference cancellation for the purpose of at least one of demodulation of a downlink channel and computation of channel state information, and wherein the indication is based on the determining.

3. The method of claim 1, wherein the indication further indicates that the UE should enable or disable one or more optional interference cancellation or mitigation techniques of the network-assisted interference cancellation.

4. The method of claim 1, wherein the indication further indicates that the UE cannot rely on a provided network assistance for one or more optional interference cancellation or mitigation techniques.

5. The method of claim 2, further comprising:
receiving an indication from the UE indicating whether the network-assisted interference cancellation has used one or more optional interference cancellation or mitigation techniques.

6. The method of claim 1, wherein the network-assisted interference cancellation comprises a blind detection of parameters of an interfering channel.

7. The method of claim 1, further comprising prior to signaling an indication to the UE:
receiving information from the UE indicating whether the UE supports one or more optional interference cancellation or mitigation techniques for at least one of demodulating the downlink channel or computing the channel state information.

8. A method in a User Equipment (UE) served by a network node, wherein the UE is capable of network-assisted interference cancellation, and the method comprising:
receiving an indication from the network node indicating whether the UE should enable or disable the network-assisted interference cancellation, or whether the UE should autonomously choose to enable or disable the network-assisted interference cancellation, for at least one of demodulating the downlink channel or computing the channel state information; and
signaling information to the network node informing the network node whether the network-assisted interference cancellation has been used by the UE for at least one of demodulating the downlink channel and computing the channel state information,
wherein the indication further indicates that the UE should autonomously choose whether to disable network-assisted interference cancellation for demodulating of the downlink channel, and that it should disable network-assisted interference cancellation for computing the channel state information.

9. The method of claim 8, further comprising, prior to signaling information to the network node:
enabling or disabling network-assisted interference cancellation in accordance with the indication.

10. The method of claim 8, wherein the indication further indicates that the UE should enable or disable one or more optional interference cancellation or mitigation techniques of the network-assisted interference cancellation.

11. The method of claim 8, wherein the indication further indicates that the UE cannot rely on a provided network assistance for one or more optional interference cancellation or mitigation techniques.

12. The method of claim 8, further comprising:
signaling an indication to the network node indicating whether the network-assisted interference cancellation has used one or more optional interference cancellation or mitigation techniques.

13. The method of claim 8, wherein the network-assisted interference cancellation comprises a blind detection of parameters of an interfering channel.

14. The method of claim 8, further comprising, prior to receiving an indication from the network node:
signaling information to the network node indicating whether the UE supports one or more optional interference cancellation or mitigation techniques for at least one of demodulating the downlink channel or computing the channel state information.

15. A network node configured to serve a User Equipment (UE) capable of network-assisted interference cancellation, the network node comprising:
a radio interface circuit configured to communicate with the UE; and
a processing circuit operatively coupled to the radio interface circuit and configured to use the radio interface circuit to:
signal an indication to the UE indicating whether the UE should enable or disable the network-assisted interference cancellation, or whether the UE should autonomously choose to enable or disable the network-assisted interference cancellation, for at least one of demodulating the downlink channel or computing the channel state information; and
receive information from the UE about whether the network-assisted interference cancellation has been used by the UE for at least one of demodulating the downlink channel and computing the channel state information,
wherein the indication further indicates that the UE should autonomously choose whether to disable network-assisted interference cancellation for demodulating of the downlink channel, and that it should disable network-assisted interference cancellation for computing the channel state information.

16. The network node of claim 15, wherein the processing circuit is further configured to:
determine prior to signaling the indication to the UE whether network conditions enable the UE to use network-assisted interference cancellation for the purpose of at least one of demodulation of a downlink channel and computation of channel state information, and wherein the indication is based on the determining.

17. The network node of claim 15, wherein the indication further indicates that the UE should enable or disable one or more optional interference cancellation or mitigation techniques of the network-assisted interference cancellation.

18. The network node of claim 15, wherein the indication further indicates that the UE cannot rely on a provided network assistance for one or more optional interference cancellation or mitigation techniques.

19. The network node of claim 15, wherein the processing circuit is further configured to:
receive an indication from the UE indicating whether the network-assisted interference cancellation has used one or more optional interference cancellation or mitigation techniques.

20. The network node of claim 15, wherein the network-assisted interference cancellation comprises a blind detection of parameters of an interfering channel.

21. The network node of claim 15, wherein the processing circuit is further configured to:
receive information from the UE prior to signaling an indication to the UE, wherein the information indicates whether the UE supports one or more optional interference cancellation or mitigation techniques for at least one of demodulating the downlink channel or computing the channel state information.

22. A User Equipment (UE) configured to be served by a network node and to be capable of network-assisted interference cancellation, the UE comprising:
a radio interface circuit configured to communicate with the network node; and
a processing circuit operatively coupled to the radio interface circuit and configured to use the radio interface circuit to:
receive an indication from the network node indicating whether the UE should enable or disable the network-assisted interference cancellation, or whether the UE should autonomously choose to enable or disable the network-assisted interference cancellation, for at least one of demodulating the downlink channel or computing the channel state information; and
signal information to the network node informing the network node whether the network-assisted interference cancellation has been used by the UE for at least one of demodulating the downlink channel and computing the channel state information,
wherein the indication further indicates that the UE should autonomously choose whether to disable network-assisted interference cancellation for demodulating of the downlink channel, and that it should disable network-assisted interference cancellation for computing the channel state information.

23. The UE of claim 22, wherein the processing circuit is further configured to:
enable or disable network-assisted interference cancellation in accordance with the indication, wherein the enabling is prior to signaling information to the network.

24. The UE of claim 22, wherein the indication further indicates that the UE should enable or disable one or more optional interference cancellation or mitigation techniques of the network-assisted interference cancellation.

25. The UE of claim 22, wherein the indication further indicates that the UE cannot rely on a provided network assistance for one or more optional interference cancellation or mitigation techniques.

26. The UE of claim 22, wherein the processing circuit is further configured to:
  signal an indication to the network node indicating whether the network-assisted interference cancellation has used one or more optional interference cancellation or mitigation techniques.

27. The UE of claim 22, wherein the network-assisted interference cancellation comprises a blind detection of parameters of an interfering channel.

28. The UE of claim 22, wherein the processing circuit is further configured to:
  signal information to the network node prior to receiving an indication from the network node, wherein the information indicates whether the UE supports one or more optional interference cancellation or mitigation techniques for at least one of demodulating the downlink channel or computing the channel state information.

29. A non-transitory computer-readable medium comprising, stored thereupon, a computer program for use in a network node configured to serve a User Equipment (UE) capable of network-assisted interference cancellation and to receive information from the UE about whether the network-assisted interference cancellation has been used by the UE for at least one of demodulating the downlink channel and computing the channel state information, the computer program comprises instructions that, when executed by a processing circuit of the network node, causes the network node to:
  signal an indication to the UE indicating whether the UE should enable or disable the network-assisted interference cancellation, or whether the UE should autonomously choose to enable or disable the network-assisted interference cancellation, for at least one of demodulating the downlink channel or computing the channel state information,
  wherein the indication further indicates that the UE should autonomously choose whether to disable network-assisted interference cancellation for demodulating of the downlink channel, and that it should disable network-assisted interference cancellation for computing the channel state information.

30. A non-transitory computer-readable medium comprising, stored thereupon, a computer program for use in a User Equipment (UE) configured to be served by a network node, to be capable of network-assisted interference cancellation, and to receive an indication from the network node indicating whether the UE should enable or disable the network-assisted interference cancellation, or whether the UE should autonomously choose to enable or disable the network-assisted interference cancellation, for at least one of demodulating the downlink channel or computing the channel state information, wherein the indication further indicates that the UE should autonomously choose whether to disable network-assisted interference cancellation for demodulating of the downlink channel, and that it should disable network-assisted interference cancellation for computing the channel state information, the computer program comprises instructions that, when executed by a processing circuit of the UE, causes the UE to:
  signal information to the network node informing the network node whether the network-assisted interference cancellation has been used by the UE for at least one of demodulating the downlink channel and computing the channel state information.

* * * * *